(12) United States Patent
Rogers

(10) Patent No.: US 10,988,177 B2
(45) Date of Patent: Apr. 27, 2021

(54) ELECTROMECHANICAL DEVICES FOR CONTROLLING VEHICLE SUSPENSION SETTINGS

(71) Applicant: Doftek Pty Ltd, Williamstown (AU)

(72) Inventor: Geoffrey William Rogers, Williamstown (AU)

(73) Assignee: Doftek Pty Ltd, Williamstown (AU)

( * ) Notice: Subject to any disclaimer, the term of this patent is extended or adjusted under 35 U.S.C. 154(b) by 115 days.

(21) Appl. No.: 16/478,394

(22) PCT Filed: Jan. 19, 2018

(86) PCT No.: PCT/IB2018/000352
§ 371 (c)(1),
(2) Date: Jul. 16, 2019

(87) PCT Pub. No.: WO2018/134689
PCT Pub. Date: Jul. 26, 2018

(65) Prior Publication Data
US 2019/0329620 A1 Oct. 31, 2019

Related U.S. Application Data

(60) Provisional application No. 62/447,912, filed on Jan. 19, 2017.

(51) Int. Cl.
*B62D 17/00* (2006.01)
*B60G 7/00* (2006.01)
(Continued)

(52) U.S. Cl.
CPC .............. *B62D 17/00* (2013.01); *B60G 3/26* (2013.01); *B60G 7/006* (2013.01); *B60G 15/068* (2013.01);
(Continued)

(58) Field of Classification Search
CPC ...... B62D 17/00; B60G 3/26; B60G 2202/42; B60G 2206/1116; B60G 2200/462; B60G 2200/46; B60G 2200/464; B60G 7/006
See application file for complete search history.

(56) References Cited

U.S. PATENT DOCUMENTS 2,907,578 A   10/1959  Taber
4,371,191 A *  2/1983  Goldberg ................. B60G 3/26
                                                  280/5.501
(Continued)

FOREIGN PATENT DOCUMENTS

CN   103317992 A   9/2013
DE   10064585 A1   9/2002
(Continued)

OTHER PUBLICATIONS

Machine translation of DE 102009033105 A1 obtained from dialogue. proquest.com Jan. 27 (Year: 2021).*
(Continued)

*Primary Examiner* — Paul N Dickson
*Assistant Examiner* — Maxwell L Meshaka
(74) *Attorney, Agent, or Firm* — Shay Glenn LLP

(57) ABSTRACT

Electromechanical apparatuses for controlling vehicle suspension settings. Described herein are electromechanical apparatuses for controlling wheel alignment (e.g., camber, castor and/or toe). In particular, described herein are camber adjusting apparatuses for electromechanically adjusting camber or camber and toe that may be retrofitted onto existing vehicle suspensions.

19 Claims, 21 Drawing Sheets

(51) Int. Cl.
*B60G 15/06* (2006.01)
*B60G 17/016* (2006.01)
*B60G 3/26* (2006.01)
(52) U.S. Cl.
CPC ........ *B60G 17/016* (2013.01); *B60G 2200/46* (2013.01); *B60G 2200/462* (2013.01); *B60G 2200/464* (2013.01); *B60G 2202/40* (2013.01); *B60G 2202/42* (2013.01); *B60G 2202/43* (2013.01); *B60G 2206/111* (2013.01); *B60G 2206/1116* (2013.01)

(56) References Cited

U.S. PATENT DOCUMENTS

| | | | |
|---|---|---|---|
| 4,700,972 A * | 10/1987 | Young | B60G 3/265 |
| | | | 280/5.508 |
| 5,143,400 A | 9/1992 | Miller et al. | |
| 5,839,749 A | 11/1998 | Lyu | |
| 5,947,459 A | 9/1999 | Ducloux et al. | |
| 6,267,387 B1 * | 7/2001 | Weiss | B60G 3/26 |
| | | | 280/124.106 |
| 6,347,802 B1 * | 2/2002 | Mackle | B60G 3/265 |
| | | | 280/5.52 |
| 6,386,553 B2 | 5/2002 | Zetterström | |
| 6,485,223 B1 | 11/2002 | Van Schmus et al. | |
| 6,676,145 B2 | 1/2004 | Carlstedt et al. | |
| 7,111,849 B2 * | 9/2006 | Yun | B60G 7/006 |
| | | | 280/5.52 |
| 7,210,693 B2 | 5/2007 | Ingalls et al. | |
| 7,407,174 B2 * | 8/2008 | Kusaka | B60G 3/20 |
| | | | 280/124.136 |
| 7,513,514 B1 | 4/2009 | Schlosser et al. | |
| 7,536,245 B2 * | 5/2009 | Naruse | B60G 17/016 |
| | | | 180/197 |
| 7,607,668 B2 | 10/2009 | Dugandzic et al. | |
| 7,878,511 B2 * | 2/2011 | Haeusler | B60G 21/007 |
| | | | 280/5.52 |
| 7,914,020 B2 | 3/2011 | Boston | |
| 8,424,880 B2 | 4/2013 | Horiguchi et al. | |
| 8,820,759 B1 | 9/2014 | Croutcher | |
| 8,973,929 B1 | 3/2015 | Seo et al. | |
| 9,085,256 B2 | 7/2015 | Parker et al. | |
| 9,102,207 B2 | 8/2015 | Raes | |
| 9,216,625 B2 | 12/2015 | Ramirez Ruiz | |
| 9,707,813 B2 | 7/2017 | Randle | |
| 10,112,649 B2 | 10/2018 | Rogers et al. | |
| 2004/0094924 A1 * | 5/2004 | Jones | B60G 3/20 |
| | | | 280/86.75 |
| 2005/0115785 A1 | 6/2005 | Thomas | |
| 2007/0080513 A1 | 4/2007 | Osterlanger et al. | |
| 2007/0131474 A1 | 6/2007 | Zetterstroem | |
| 2009/0267312 A1 | 10/2009 | Vaxelaire | |
| 2014/0239603 A1 * | 8/2014 | Balandin | B60G 21/007 |
| | | | 280/5.521 |
| 2017/0305221 A1 * | 10/2017 | Schmidt | B60G 7/001 |
| 2020/0223270 A1 * | 7/2020 | Kunkel | B60G 3/26 |

FOREIGN PATENT DOCUMENTS

| | | | | |
|---|---|---|---|---|
| DE | 102009033105 A1 * | 1/2011 | | B60G 3/26 |
| DE | 102010041407 A1 * | 3/2012 | | B60G 7/02 |
| DE | 102012019870 A1 * | 4/2014 | | B60G 11/50 |
| DE | 102016203872 A1 * | 9/2017 | | B62D 17/00 |
| EP | 3463939 A1 | 4/2019 | | |
| JP | H05-221217 A | 8/1993 | | |
| JP | 2006224829 A | 8/2006 | | |
| KR | 10-2011-058462 A | 6/2011 | | |
| KR | 10-1461903 B1 | 11/2014 | | |
| KR | 10-2015-099138 A | 8/2015 | | |

OTHER PUBLICATIONS

Machine translation of DE 102010041407 A1 obtained from dialogue. proquest.com Jan. 27 (Year: 2021).*
Machine translation of DE 102016203872 A1 obtained from dialogue. proquest.com Jan. 25 (Year: 2021).*
Machine translation of DE 102012019870 A1 obtained from dialogue. proquest.com Jan. 25 (Year: 2021).*

* cited by examiner

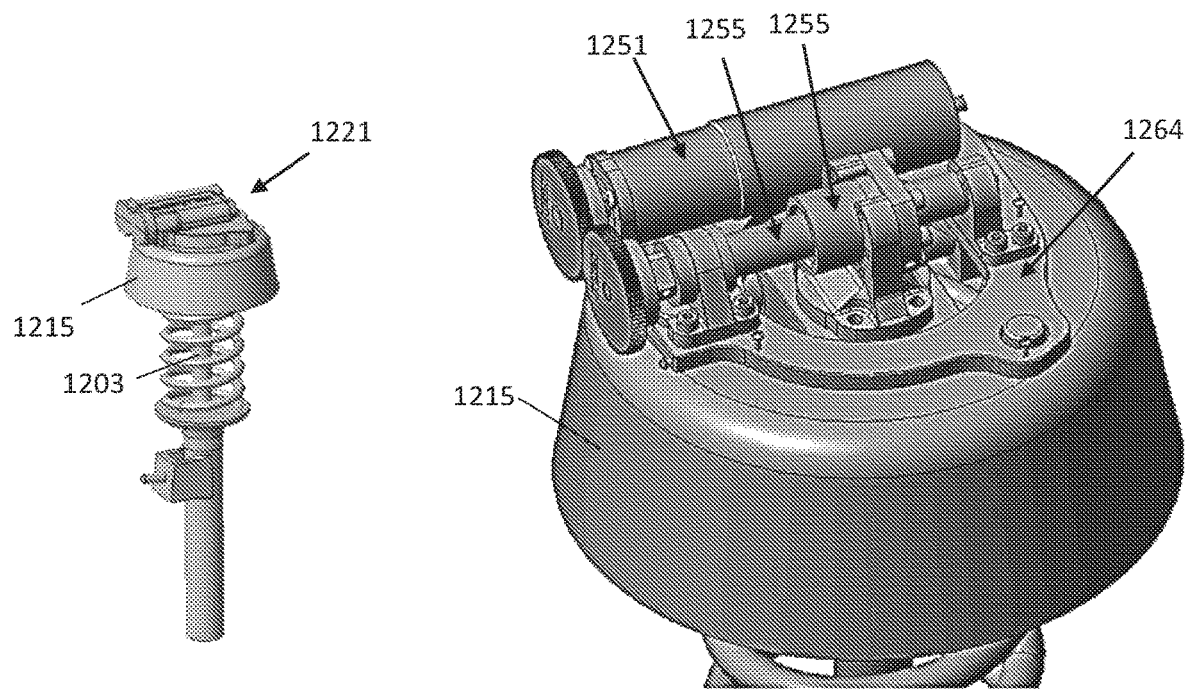
FIG. 12A
FIG. 12B
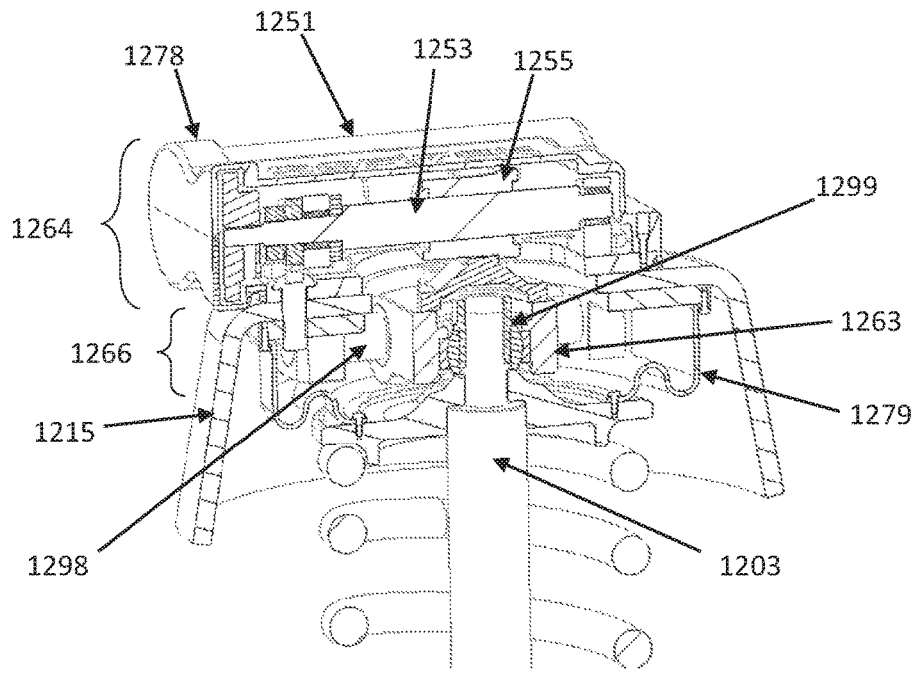
FIG. 12C

ELECTROMECHANICAL DEVICES FOR CONTROLLING VEHICLE SUSPENSION SETTINGS

CROSS REFERENCE TO RELATED APPLICATIONS

This patent claims priority to U.S. provisional patent application No. 62/447,912, titled "Electromechanical Devices for Controlling Vehicle Suspension Settings" and filed on Jan. 19, 2017, which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are electromechanical apparatuses for controlling vehicle suspension settings. For example, described herein are electromechanical devices and systems for controlling wheel alignment (camber, castor and toe), anti-roll bar stiffness and roll centers of a vehicle. In particular, described herein are apparatuses for electromechanically adjusting camber or camber and toe that may be retrofitted onto existing vehicle suspensions.

BACKGROUND

The positional settings on any vehicle's (e.g. an automobile's) suspension system significantly affect the vehicle's driving characteristics, including handling, tire wear, fuel efficiency, safety, passenger comfort, and the like. There is typically a trade-off between these characteristics, whereby one set of settings tends to optimize some driving characteristics, while another set of settings tends to optimize other driving characteristics.

For example, vehicles predominantly used for normal road applications typically use more neutral settings for camber, castor and/or toe that optimize passenger comfort, but sacrifice handling performance. On the other hand, vehicles predominantly used for competition applications (e.g. racing) typically use more aggressive settings that optimize handling performance, but sacrifice passenger comfort.

If a vehicle is generally used for a single purpose only, settings can be fixed appropriately for that application. However, there are many vehicles that are used for more than one purpose, or in more than one set of driving conditions, where it is desirable to alter settings. For example, many modern sports cars are used for commuting to work during the week (where passenger comfort is desirable), and then used for sport/recreational use on the weekend (where handling performance is desirable).

Suspension settings that may be adjusted on a vehicle in order to alter driving characteristics may include: spring rates, damper rates, wheel alignment (e.g., camber, castor and toe), anti-roll bar rates, roll centers, tire pressures, and the like. While magnetic or adaptive dampers allow the damping rates of a suspension system to be conveniently adjusted via the push of a button or automatically, all other settings must be adjusted manually, most commonly by a mechanic. For people frequently using their vehicles for more than purpose, or in more than one set of driving conditions, it is time-consuming and expensive to alter settings often.

Thus, there is a need for a solution that enables suspension settings other than just damper rates to be quickly and easily altered, for example, by the press of a button or automatically. Further, it would be particularly useful to provide solutions that may be retrofitted onto existing suspensions systems. Described herein are apparatuses (e.g. devices and systems) and methods of making and operating them, which address this need. Any of the apparatuses described herein may manually, automatically or semi-automatically (e.g., electromechanically, robotically, etc.) adjust one or more suspension settings such as camber, toe, and castor or combinations of these.

SUMMARY OF THE DISCLOSURE

The present invention relates generally to electromechanical apparatuses (devices and methods) for controlling the suspension settings of a vehicle, and methods of making and using them. In particular, the electromechanical systems described herein typically include one or more devices to control one or more of wheel alignment (camber, castor and/or toe), anti-roll bar rates and/or roll centers, on a vehicle. In particular, described herein are apparatuses and methods for controlling camber and/or toe, and/or castor.

In general, the suspension settings for each wheel may be jointly or independently controlled by a single apparatus or a plurality of apparatuses. The apparatuses may be configured to be compatible with the vehicle manufacturer's standard suspension systems, or with aftermarket suspension systems.

Any of the devices described herein may be used on the suspension for any wheel, including a left (e.g. driver's side) wheel, a right (e.g. passenger's side) wheel, a front wheel, or a rear wheel. For example, a vehicle may have one or more devices fitted to the front wheels only to control front suspension settings. In another example, a vehicle may have one or more devices fitted to the front and rear wheels to control front and rear suspension settings.

In general, the suspension settings of each wheel may be controlled independently of all other wheels. For example, it may be possible to have different suspension settings between front and rear wheels, and/or between left and right wheels.

The apparatuses described herein include apparatuses for controlling wheel alignment settings, including camber, castor and/or toe. In general, for each wheel, the camber, castor and/or toe may be controlled independently of each other. For example, it may be possible to alter the camber of a wheel without altering the castor and/or toe of that wheel. Alternatively, for any of the apparatuses described herein, modification to one or more of the wheel alignment parameters (camber, toe, castor) may automatically adjust one or more of the other wheel alignment parameters. For example, modifying the camber of a tire may automatically modify the toe of the same tire.

In general, the camber, castor and toe of each wheel may be controlled by separate apparatuses. One apparatus may control the camber, while a second apparatus controls the castor, and a third apparatus controls the toe. A controller for a vehicle may be configured such that only certain alignment settings for certain wheels may be altered. For example, a vehicle (e.g., a controller for controlling wheel alignment of the vehicle) may be configured with one apparatus for controlling the camber of one wheel only, with no control over the castor or toe of that wheel, and no control over the alignment settings of any other wheel(s). In another example, a vehicle may be fitted with four apparatuses: one for controlling the camber of the front left wheel; one for controlling the camber of the front right wheel; one for controlling the toe of the front left wheel; and one for controlling the toe of the front right wheel. Each apparatus may be controlled independently of all other apparatus, or in combination with one or more other apparatus. Alternatively or additionally, a single apparatus may be used to control one or more alignment settings of all of the wheels. For example, a single apparatus may be used to control the camber of all of the wheels (or a subset of the wheels such as the front wheels, rear wheels, right wheels, left wheels, etc.). Alternatively or additionally, a plurality of apparatuses may be used to control a single alignment setting of a single wheel. For example, two apparatuses may be used to control the camber of a single wheel.

The apparatuses described herein include apparatuses (e.g., devices, systems) for controlling anti-roll bar (otherwise termed sway bar, stabilizer bar, etc.) settings. In particular, one or more devices may be used to control the stiffness of one or more anti-roll bars. Where a vehicle is fitted with front and rear anti-roll bars, one or more devices may be fitted to either the front anti-roll bar to control front stiffness, the rear anti-roll bar to control rear stiffness, or both the front and rear anti-roll bars to control front and rear stiffness.

The apparatuses described herein include devices or systems for controlling roll center settings. In particular, one or more devices may be used to control the settings of one or more roll centers of a vehicle.

The apparatuses described herein typically include at least one structural member configured to support the relevant static and dynamic loads of the vehicle; at least one adjustment member configured to control and alter at least one suspension setting of or related to the structural member; and at least one driver configured to drive translation of the adjustment member(s). Any of the apparatuses described herein may typically mount to a structural member of a vehicle's suspension and/or the vehicle's frame. Thus, any of the apparatuses described herein may include a mount (e.g., mount body) that holds or couples with a structural member of the vehicle's suspension and/or a holds or couples with the vehicle's frame.

The at least one structural member may be any appropriate type of structural member, including (but not limited to) a beam, support, shaft, rail, rod, housing, stage, mount, bracket, bolt, nut, screw (e.g. power screw, lead screw, ball screw, etc.), and the like. The structural member may remain stationary or may translate in rotation or in linear dimensions, or in rotation and linear dimensions.

The at least one adjustment member may be any appropriate type of adjustment member, including (but not limited to) a screw (e.g. power screw, lead screw, ball screw, etc.), gear (e.g. spur gear, helical gear, worm gear, etc.), pulley, belt, shaft, slide, pivot, lever-arm, connecting rod, cam, and the like. The adjustment member may translate in rotation or in linear dimensions, or in rotation and linear dimensions.

The at least one driver may be any appropriate type of driver, including (but not limited to) a mechanical actuator (e.g., motor, etc.), a pneumatic actuator, a hydraulic actuator, an electrical actuator, and the like. The driver may translate in rotation or in linear dimensions, or in rotation and linear dimensions.

In general, an apparatus for adjusting camber of a vehicle adjusts the camber by driving a portion of the suspension in an axial direction to apply force (either pushing or pulling) to a region of the tire that is radially offset from the center and positioned above the central (rotational) axis of the tire. These camber-adjusting apparatuses typically include an electromechanical actuator, which may include an electric motor (or other actuator) and modifies the position of a portion of the wheel suspension that is above the central axis of the tire. The device may be mounted to the wheel suspension, preferably in a region that does not substantially add to the unsprung mass of the wheel; thus, it may be preferable that the camber-adjusting apparatus mount distally from the wheel steering knuckle (e.g., hub), including on the frame. Any of the apparatuses for adjusting camber described herein may also generally include a holder (generically described as an arm holder, which includes a suspension arm holder or a wishbone arm holder) for holding a portion of the suspension, such as an upper wishbone or triangle (in a double wishbone type suspension) or a shaft (of a MacPherson-type suspension) so that it may be moved relative to the mount body by moving the portion having the holder against a bearing surface that is part of the mount body.

For example, an apparatus for controlling camber may include: a housing enclosing all or part of the apparatus, a mount body, including a translational bearing surface which may be preferably configured, e.g., as one or more support rails, a holder, such as an arm holder, for connecting to a suspension component, where the translational bearing surface is between the holder and the mount body, and an electromechanical actuator (e.g., electric motor). The holder may be part of a linear stage, e.g., the linear stage may connect to and support the holder through the bearing surface. The electromechanical actuator may include a low-friction ball screw and nut assembly (adjustment members), and may connect to the linear stage and/or holder (e.g., the electromechanical actuator may directly or indirectly connect to the holder) to drive the holder/linear stage on the bearing surface. For example, the electric motor (driver) may be configured to rotate the ball screw and thereby translate the linear stage. A camber adjusting apparatus may, for example, be located atop the strut in a MacPherson suspension system and mounted to the frame to translate the top of the strut in an axis of direction (in/out), thereby altering the camber of the tire.

The devices described herein are typically controlled electronically. Each device may be controlled by its own electronic system, by another device's electronic system, by a common, centralized electronic system, or by a combination of electronic systems. In particular, the at least one driver may be controlled electronically. For example, each device may include a micro-controller configured to receive user inputs and/or sensor inputs, and to send commands to the at least one driver via appropriate drive electronics.

Any electronic system used to control any device herein may be used to control other devices/systems/functions, whether they are described herein or not. For example, a common, centralized electronic system may control a number of devices described herein when fitted to a vehicle, and also control that vehicle's magnetic dampers.

A device may include open-loop or closed-loop control. For open-loop operation, suspension settings may be electromechanically adjusted by a user to the user's satisfaction. Methods of adjustment may include (but are not limited to) a switch, button, user interface, or the like.

Any of these apparatuses may include one or more sensors, including (but not limited to) position sensors, encoders (e.g. linear, rotary, optical, etc.), limit switches, proximity sensors, temperature (thermal) sensors, reed switches, light sensors (e.g. ultraviolet, infrared, etc.), accelerometers, and the like. Closed-loop configurations of these apparatuses may include one or more such sensors, which may use information from one or more of these sensors and/or user input (from a button, dial, screen/touchscreen, knob, etc.) to adjust one or more aspect of the wheel alignment such as camber, toe, and/or castor.

An apparatus may be configured with a plurality of discrete modes. Modes may correspond to pre-determined positions for camber and/or toe and/or caster. These modes may be set by a vehicle owner, a vehicle manufacturer, a service technician, or the like. A user may select these modes via an input or control, such as a switch, button, user interface (touchscreen), keypad, keyboard, dial, knob, slider, or the like. For example, an apparatus may be configured with a "normal" mode for normal road use, providing neutral suspension settings (high comfort, low handling performance); a "sport" mode for light performance use, providing slightly altered suspension settings (medium comfort, medium handling performance); and a "race" mode for high performance use, providing highly altered suspension settings (low comfort, high handling performance). These mode settings may correspond to particular positional settings of the camber adjusting apparatus and/or toe-adjusting apparatus, and/or castor-adjusting apparatus. They may be stored in a memory of the electronic controller, for example. An apparatus may be configured with a continuous range of adjustment, allowing a user to fine-tune the settings to his/her liking A user may make the adjustments via any appropriate input (e.g., switch, button, user interface, etc.). An output (e.g., dial, screen, LEDs, etc.) may be used to inform a user of the settings currently being used. For example, a closed-loop device may include a switch set, a rotary dial and a screen, whereby the switch set is used to select the suspension setting to control, the rotary dial is used to adjust the suspension setting, and the screen reports the current setting back to a user. This enables a user to customize settings.

Any device described herein may include a screen or other form of output device to notify a user if/when the suspension settings on one or more wheels deviate from the desired value(s). For example, if a wheel hits a curb with sufficient force to alter the alignment of that wheel, feedback sensors can be used to detect and report the situation to a user.

Any device described herein may provide feedback data other than suspension settings to a user, including (but not limited to) tire temperatures, temperature profiles of tires, tire wear, tread depth, tire damage, tire deformation, tire pressures, wheel angles, wheel distances, wheel locations, wheel displacements, and the like.

Any of the apparatuses described herein may be configured to operate automatically or semi-automatically (e.g., with assisted user input or confirmation). One or more sensors may be used to monitor certain variables intermittently or continuously. The values of these variables may be used to determine what suspension settings, if any, should be adjusted. The sensor data may be reported to an electronic control system, computer, or the like, which may automatically alter suspension settings intermittently or continuously without any user input. Sensor inputs may include (but are not limited to) tire temperatures, temperature profiles of tires, tire wear, tread depth, tire damage, tire deformation, tire pressures, wheel angles, wheel distances, wheel locations, wheel displacements, vehicle acceleration (in any direction), brake input, throttle input, steering angle, wheel slip, or the like.

A closed-loop (or semi-closed-loop) device may be configured to operate automatically/semi-automatically and may include a temperature sensor located near a tire to monitor the temperature profile across that tire, from the inner edge to the outer edge of the tire, or from the outer edge to the inner edge of the tire. The temperature profile of a tire may be used to determine whether the suspension settings currently set are the most appropriate settings for the current use or application of the vehicle. For example, a wheel with neutral camber settings currently being used for aggressive cornering may have a higher temperature towards the outer edge of the tire, indicating that more negative camber may be necessary. In another example, a wheel with more negative camber currently being used for driving in a straight line may have a higher temperature towards the inner edge of the tire, indicating that less negative camber (a more neutral setup) may be necessary.

Automatically or semi-automatically operating apparatuses may include accelerometers, which may be used to monitor the current use or application of the vehicle. The accelerometer data may be used to determine the most appropriate suspension settings. For example, one or more accelerometers may be used to measure the longitudinal and/or lateral acceleration of the vehicle to determine whether the vehicle is cornering or driving straight. In another example, one or more accelerometers may be fitted to one or more wheels or suspension components to monitor the behavior of said wheels or suspension components.

A closed-loop/semi-closed loop device that is configured to operate automatically or semi-automatically may include more than one type of sensor to monitor and determine the most appropriate suspension settings based on the current use or application of the vehicle. For example, temperature sensors may be used to monitor the temperature profile of one or more tires, and accelerometers may be used to monitor the longitudinal and lateral acceleration of the vehicle, the combination of these data inputs providing a more complete assessment of the vehicle's current use or application.

For any of the apparatuses described herein (and particularly the closed-loop or semi-closed-loop apparatuses), sensors and/or settings may be monitored intermittently or continuously. Further, some sensors and/or settings may be monitored intermittently, while others are monitored continuously.

For any of the devices described herein, suspension settings may be controlled by a user via any appropriate input device including (but not limited to) one or more switches, buttons, dials, user interfaces, personal computers, laptops, tablets, smartphones, touchscreen devices, and the like.

For any of the apparatuses described herein, the objective behind monitoring and/or adjusting suspension settings may include (but is not limited to) reducing or minimizing tire wear, increasing or maximizing performance, improving safety, increasing passenger comfort, providing a compromise between certain factors, and the like.

Any of the apparatuses described herein may be applied to any vehicle where measurement and/or control over suspension settings is desirable, including (but not limited to) passenger vehicles, cars, buses, trucks, motorcycles, bicycles, commercial vehicles, special vehicles, on-road vehicles, off-road vehicles, racing cars, vehicles for competition use, front-wheel drive vehicles, rear-wheel drive vehicles, all-wheel vehicles, four-wheel drive vehicles, and the like.

In general, any of the apparatuses described herein may be applied to any suspension setup, including (but not limited to) fixed axle, independent, MacPherson strut, wishbone, double-wishbone, multi-link, air suspension, leaf spring, torsion bar suspension, or the like. In particular, any of the apparatuses and methods described herein may be configured for retrofitting an existing suspension. Thus, any of these apparatuses may be configured for retrofitting an existing suspension by having a particular shape or profile as shown and described, and/or for mounting to known elements such as a strut of a MacPherson suspension and/or an upper wishbone (triangle) of a dual-wishbone suspension, etc.

In general, the apparatuses described herein are configured so that the electromechanical portion does not need to operate under high loads, including the static load of the vehicle weight (e.g., the weight supported by the frame) or the dynamic weight when operating the vehicle. Thus, any of the apparatuses described herein may be configured so that the apparatus (e.g., camber adjusting apparatus) is divided into portions that support high or low loads; the portion supporting the high load typically mounts to the frame and supports the holder connected to the suspension, while the portion supporting low loads couples to the electromechanical actuator and drives the movement of the supported holder to adjust the alignment. This allows the electromechanical actuator to operate more efficiently and reliably, without having to move or operate under a heavy load, and permits the use of smaller and lighter motors.

In addition, each of the apparatuses described herein for adjusting one of camber, toe or caster is configured so that it permits movement in only one, predictable axis of movement, while constraining movement in the other (perpendicular) axes.

For example, an apparatus for adjusting camber of a vehicle having a suspension (in which the suspension includes an upper arm) may include: a mount body having a translational bearing surface, wherein the mount body is configured to rigidly connect to the vehicle's frame; an arm holder configured to hold an end of the upper arm, wherein the arm holder is movably connected to the translational bearing surface, further wherein the translational bearing surface is configured to permit the arm holder to move in a first translational axis and to constrain the arm holder from moving in a second translational axis that is transverse to the first translational axis or a third translational axis that is transverse to the second translational axis; and an electromechanical actuator coupled to the arm holder to drive the arm holder along the translational bearing surface in the first translational axis.

The upper arm may refer to any portion of the suspension, and particularly known suspensions, such as MacPherson type suspension, wishbone (e.g., double wishbone) suspensions, etc. For example, the upper arm may be the strut of a MacPherson, or one end of the upper wishbone of a wishbone (e.g., double wishbone) suspension.

The mount body may include a housing and the translational bearing surface, and may be referred to as including a 'stage' (e.g., an upper stage and a lower stage, in some examples). The mount body may connect, e.g., rigidly, to the frame of the vehicle. The frame of the vehicle typically refers to the main supporting structure of a motor vehicle to which other components are attached (e.g., the skeleton, body shell, chassis or monocoque of the vehicle) and may act as the mechanical ground for the apparatuses described in some of the examples herein. As used herein rigid connection between the mount body and the frame may refer to a connection that resists or prevents relative movement between the two bodies, although they may be connected through one or more intermediate bodies (e.g., washers, rings, etc.).

The mount body may include an upper mount body and a lower mount body, and may be configured so that the vehicle's frame may be secured between the upper mount body and the lower mount body. In particular, when the upper arm holder is configured as a strut holder, to hold the strut of a MacPherson-type suspension, the mount body may include an upper mount body portion and a lower mount body portion, as will be described in greater detail below. In this configuration, the camber may be controlled from atop the tower of the strut tower, because the upper mount body may be attached from above the strut tower (and is a low load supporting portion) while the lower mount body may be attached from below the strut tower (and is a high load supporting portion). The vehicle frame may be held between the two.

In any of the apparatuses having an upper and lower mount body (and particularly the camber adjusting apparatuses described herein, including those adapted to couple to a strut of a MacPherson-type suspension), the lower mount body may include the translational bearing surface. Typically the translational bearing surface is configured by shape and orientation to permit movement in a single translational axis. For example, the translational bearing surface may comprise one or more (e.g., a pair) of shafts extending in parallel on either side of the arm holder. The outer surface of the shafts may form the bearing surface. The shafts may be cylindrical, and/or may have any appropriate cross-section (circular, oval, rectangular, triangular, hexagonal, etc.). The shafts may be sized and positioned to support a high load.

Any of these apparatuses may include a linear bearing (e.g., a linear ball bearing or a bush) that is rigidly connected to the arm holder and movably connected to the translational bearing surface. The linear bearing may be configured to be able to slide (with low friction) over the translational bearing surface, particularly when the translational bearing surface is part of a shaft (or pair of shafts). In some variations a pair of linear bearings (e.g., one on each of a pair of shafts) are rigidly connected to the arm holder. Any appropriate type of linear bearing may be used, including a rolling element bearing (e.g., ball bearing slide, ball slide, roller slide, crossed roller slide, etc.) a plane bearing (e.g., dovetail slide, compound slide, rack slide), a bush, etc. As mentioned, the arm holder may be part of a linear stage or may be connected to a linear stage that moves on the translational bearing surface and relative to the mount body.

In general, the electromechanical actuator may comprise an electric motor coupled to the arm holder to move it in the first translational axis. Other elements of the electromechanical actuator include gearing (e.g., gear assembly for translating a rotational motion of the motor into linear motion for pushing or pulling along the first translational axis). In general, the electromechanical actuator may be positioned generally in a plane that is parallel with the first translational axis, although it may have any appropriate orientation.

In any of the apparatuses described herein, the electromechanical actuator may include a ball screw and a ball nut, wherein the ball nut is coupled to the arm holder and is configured to be driven back and forth along the ball screw, e.g., by the action of the motor (or other driver). Any mechanical linear actuator may be used instead of or in addition to the ball screw/ball nut. For example, other screw mechanisms (roller screw, lead screw, screw jack, etc.), wheel and axle, or cams may be used.

In general, any of the apparatuses may include a sensor, such as an encoder, configured to monitor the position of the apparatus. For example, an encoder may be used to monitor the position of the arm holder and thereby the position of the suspension arm being held (e.g., the upper wishbone position, the strut position, etc.).

In any of the apparatuses described herein, the arm holder may be configured so that the end of the upper arm may move or be fixed. For example, the arm holder may be configured to allow the upper arm (e.g., upper wishbone end) to pivot relative to the arm holder. In some variations the arm holder may be configured to allow the upper arm to pivot and move as if hinged. The upper arm holder may be configured to allow the strut to pivot.

The translational bearing surface may be configured to support a load (e.g., strut load and/or radial load) of greater than a minimum load threshold (e.g., supporting a substantial portion of the weight of the vehicle), such as at least about 1000 kilograms (kg), e.g., about 1500 kg or more, about 2000 kg or more, about 2500 kg or more, about 3000 kg or more, about 3200 kg or more, about 3500 kg or more, about 4000 kg or more, etc. Thus, in variations in which the apparatus includes a two part (or more) mount body in which the lower mount body supports a high load, the high load may be at least this minimum load threshold, while the upper mount may be configured to support much less of a load (e.g., less than about 1000 kg, less than about 900 kg, less than about 800 kg, less than about 700 kg, less than about 600 kg, less than about 500 kg, etc.).

For example, an apparatus for adjusting camber of a vehicle having a suspension with an upper arm, the apparatus may include: a mount body having a translational bearing surface, wherein the mount body is configured to rigidly connect to the vehicle's frame; an arm holder configured to hold an end of the upper arm, wherein the arm holder is movably connected to the translational bearing surface, further wherein the translational bearing surface is configured to permit the arm holder to move in a first translational axis and to constrain the arm holder from moving in a second translational axis that is transverse to the first translational axis or a third translational axis that is transverse to the second translational axis; a linear bearing that is rigidly connected to the arm holder and movably connected to the translational bearing surface; an electromechanical actuator coupled to the arm holder to drive the arm holder along the translational bearing surface in the first translational axis; and an electronic controller configured to control actuation of the electromechanical actuator.

As mentioned above, any of the camber adjusting apparatuses described herein may be configured specifically for adjusting camber in a vehicle having a MacPherson-type suspension, including an upper arm that is configured as a strut. For example a device for adjusting camber of a vehicle having a suspension including a strut may include: a mount body having a translational bearing surface, wherein the mount body is configured to rigidly connect to the vehicle's frame; a strut holder configured to hold an end of the strut, wherein the strut holder is movably connected to the translational bearing surface, further wherein the translational bearing surface is configured to permit the strut holder to move in a first translational axis and to constrain the strut holder from moving in a second translational axis that is transverse to the first translational axis or a third translational axis that is transverse to the second translational axis; and an electromechanical actuator coupled to the strut holder to drive the strut holder along the translational bearing surface in the first translational axis.

As mentioned any of the apparatuses described herein may include an electronic controller that is configured to control actuation of the electromechanical actuator. The electronic controller may be integrated into the device (e.g., within a housing coupled to the mount body, for example), or it may be located remote from the mount body and may connect via a wired or wireless connection. In some variations the electronic controller (which may be referred to herein a controller or as control circuitry), may include circuitry such as a processor, memory, timer/clock, power supply regulatory circuitry, etc. The electronic controller may be connected to a power source (e.g., battery), including connected to the vehicle power supply.

A device for adjusting camber of a vehicle having a suspension including a strut may include: an upper mount body and a lower mount body configured so that the vehicle's frame may be secured between the upper mount body and the lower mount body, wherein the lower mount body comprises a translational bearing surface; a strut holder configured to hold an end of the strut, wherein the strut holder is movably connected to the translational bearing surface, further wherein the translational bearing surface is configured to permit the strut holder to move in a first translational axis and to constrain the strut holder from moving in a second translational axis that is transverse to the first translational axis or a third translational axis that is transverse to the second translational axis; an electromechanical actuator coupled to the strut holder to drive the strut holder along the translational bearing surface in the first translational axis; and an electronic controller configured to operate the electromechanical actuator.

A device for adjusting camber of a vehicle having a suspension including a strut may include: an upper mount body and a lower mount body configured so that the vehicle's frame may be secured between the upper mount body and the lower mount body, wherein the lower mount body comprises a translational bearing surface formed by one or more shafts; a strut holder configured to hold an end of the strut, wherein the strut holder is movably connected to the one or more shafts forming the translational bearing surface by a linear bearing so that the strut holder moves in a first translational axis and is constrained from moving in a second translational axis that is transverse to the first translational axis or a third translational axis that is transverse to the second translational axis; an electromechanical actuator coupled to the strut holder to drive the strut holder along the translational bearing surface in the first translational axis; and an electronic controller configured to operate the electromechanical actuator.

Any of the apparatuses described herein may be configured to retrofit onto an existing suspension. For example, a method of installing and/or operating an apparatus (e.g., device) for adjusting camber of a vehicle having a suspension including a strut may include placing the apparatus on the top of the strut of a suspension such as a MacPherson-type suspension. This may include installing a first (e.g., upper) mount body portion above the strut tower, which may include on a first, upper, side of the frame (e.g., above the wheel region), and connecting it to a second (e.g., lower) mount body portion on the opposite underside portion of the body frame, e.g., through an opening in the body frame. The second mount body portion may support a high load passed through the strut, while the first mount body portion does not need to support the high load, and may include the electromechanical actuator that may then operate under the much lower load conditions. The strut may fit into the strut holder and be secured by the strut holder. In operation, the electromechanical actuator may drive movement of the strut by moving the strut holder on the bearing surface in the first axis defined by the bearing surface. This first axis may be aligned during installation with the axis of the wheel (e.g., approximately the axis of rotation of the wheel). By controlling the electromechanical actuator (e.g., a motor of the electromechanical actuator), either automatically or manually (e.g., using a user control to set or adjust the camber) the camber may be adjusted by driving the strut in towards the tire or out, away from the tire along the first translational axis, resulting in positive or negative camber. The installation steps may be repeated for one or more additional tires. In operation, the controller may apply power to drive the electromechanical actuator to move the holder in the first translational axis (positive or negative movement). In any of the devices described herein, the apparatus may lock or otherwise secure the position of the holder relative to the mount body, so that the position does not slip or inadvertently change. For example, the electromechanical actuator may be configured to lock or hold the position when not actuated. A separate translation lock may be included (prohibiting translation of the electromechanical actuator) as part of the electromechanical actuator, e.g., coupled to or as part of the linear actuator, preventing movement until the lock is released. Alternatively or additionally the lock may be included as part of the holder or translation stage. The lock may be an electromechanical brake. In any of the apparatuses described herein, the electromechanical actuator (e.g., electric motor) may remain active while the vehicle is on, and may detect, including using a sensor such as an encoder, slippage or unintended movement of the holder and therefore an un-intended change in camber, and may automatically resist and/or adjust back to the intended/target position.

In any of the apparatuses described herein, the apparatus may limit the travel of the holder (e.g., of the translation stage including the holder) at either end. This may prevent the apparatus from extending beyond the transitional bearing surface. The apparatus may also, when first turning on, initialize the position (e.g., the encoder) by scanning between the extreme limits of the transitional bearing surface, e.g., the limited path of the holder/translation stage on the translational bearing surface.

In some variations of the apparatuses described herein the apparatus is configured for use with a wishbone-type suspension (also referred to as A-arm or triangle-arm suspensions). In particular, described herein are methods and apparatuses for adjusting camber of a vehicle having an upper wishbone arm and a lower wishbone arm. A system for adjusting camber of a vehicle having a suspension with an upper wishbone arm and a lower wishbone arm (in which the upper wishbone arm has a first end and a second end, the "arms" of the wishbone) may include: a mount body having a translational bearing surface, wherein the mount body is configured to rigidly connect to the vehicle's frame; a wishbone arm holder configured to hold the first end of the upper wishbone arm so that the first end of the upper wishbone arm may pivot relative to the wishbone arm holder, wherein the wishbone arm holder is movably connected to the translational bearing surface, further wherein the translational bearing surface is configured to permit the wishbone arm holder to move in a first translational axis and to constrain the wishbone arm holder from moving in a second translational axis that is transverse to the first translational axis or a third translational axis that is transverse to the second translational axis; and an electromechanical actuator coupled to the wishbone arm holder to drive the wishbone arm holder along the translational bearing surface in the first translational axis.

The first end and the second end of the wishbone arm may refer to the ends of the wishbone that do not connect near the knuckle (hub) and wheel, which is a third end of the wishbone arm. In general, because there are typically two ends for upper wishbone that may couple to the frame of the vehicle, any of these apparatuses (e.g., systems) may include a second set of camber-adjusting components (e.g., a second mount body, second wishbone arm holder configured to hold the second end of the upper wishbone arm, and a second electromechanical actuator). For example, the system may include: a second mount body having a second translational bearing surface, wherein the second mount body is configured to rigidly connect to the vehicle's frame; a second wishbone arm holder configured to hold the second end of the upper wishbone arm so that the second end of the upper wishbone arm may pivot relative to the second wishbone arm holder, wherein the second wishbone arm holder is movably connected to the second translational bearing surface, further wherein the second translational bearing surface is configured to permit the second wishbone arm holder to move in the first translational axis and to constrain the second wishbone arm holder from moving in the second translational axis or the third translational axis; and a second electromechanical actuator coupled to the second wishbone arm holder to drive the second wishbone arm holder along the second translational bearing surface in the second translational axis.

For example, a system for adjusting camber of a vehicle having a suspension with an upper wishbone arm and a lower wishbone arm, the upper wishbone arm having a first end and a second end, the system comprising: a first mount body having a first translational bearing surface, wherein the first mount body is configured to rigidly connect to the vehicle's frame; a first wishbone arm holder configured to hold the first end of the upper wishbone arm so that the first end of the upper wishbone arm may pivot relative to the first wishbone arm holder, wherein the first wishbone arm holder is movably connected to the first translational bearing surface, further wherein the first translational bearing surface is configured to permit the first wishbone arm holder to move in a first translational axis and to constrain the first wishbone arm holder from moving in a second translational axis that is transverse to the first translational axis or a third translational axis that is transverse to the second translational axis; and a first electromechanical actuator coupled to the first wishbone arm holder to drive the first wishbone arm holder along the first translational bearing surface in the first translational axis; a second mount body having a second translational bearing surface, wherein the second mount body is configured to rigidly connect to the vehicle's frame; a second wishbone arm holder configured to hold the second end of the upper wishbone arm so that the second end of the upper wishbone arm may pivot relative to the second wishbone arm holder, wherein the second wishbone arm holder is movably connected to the second translational bearing surface, further wherein the second translational bearing surface is configured to permit the second wishbone arm holder to move in the first translational axis and to constrain the second wishbone arm holder from moving in the second translational axis or the third translational axis; a second electromechanical actuator coupled to the second wishbone arm holder to drive the second wishbone arm holder along the second translational bearing surface in the second translational axis; and an electronic controller configured to operate the first and second electromechanical actuators.

Any of the features described above may be included in a system adapted for a wishbone, including the electronic controller, rod-shaped (e.g., shaft-shaped) translational bearing surface, linear bearings, and the like. A single electronic controller may be used to control multiple electromechanical actuators; alternatively each electromechanical actuator may be coupled to a single electromechanical actuator.

Any of the features described above may be included in a system adapted for a wishbone, including the electronic controller, shaft-shaped translational bearing surface, linear bearings, and the like.

Also described herein are methods of adjusting camber of a vehicle having a suspension with an upper wishbone arm and a lower wishbone arm, the upper wishbone arm having a first end and a second end, the method comprising: activating a first electromechanical actuator to drive a first wishbone arm holder on a first translational bearing surface that is rigidly connected to the vehicles frame so that the first wishbone arm holder moves in a first translational axis, wherein the first wishbone arm holder is coupled to the first end of the upper wishbone arm; and activating a second electromechanical actuator to drive a second wishbone arm holder on a second translational bearing surface that is rigidly connected to the vehicle frame so that the second wishbone arm holder moves in the first translation axis, wherein the second wishbone arm holder is coupled to the second end of the upper wishbone arm.

Activating the first electromechanical actuator and activating the second electromechanical actuator may occur concurrently. Alternatively, activating the first electromechanical actuator may occur subsequent to (immediately after, or within a few seconds or minutes after) activating the second electromechanical actuator.

Activating the first electromechanical actuator may include manually activating the first electromechanical actuator. Alternatively, activating the first electromechanical actuator may include automatically (or semi-automatically) activating the first electromechanical actuator.

Any of these methods may include adjusting the toe of the suspension concurrently with adjusting the first electromechanical actuator, or adjusting the toe immediately before or after adjusting the camber.

Also described herein are methods and apparatuses for adjusting camber and toe of a vehicle having a suspension with an upper arm and a tie rod. Generally, these methods may include any of the apparatuses for adjusting camber as described herein, and may also include an apparatus for adjusting toe. For example, an apparatuses for adjusting camber and toe of a vehicle having a suspension with an upper arm and a tie rod may include: a camber adjusting unit comprising: a mount body having a translational bearing surface, wherein the mount body is configured to rigidly connect to the vehicle's frame; an arm holder configured to hold an end of the upper arm, wherein the arm holder is movably connected to the translational bearing surface, further wherein the translational bearing surface is configured to permit the arm holder to move in a first translational axis and to constrain the arm holder from moving in a second translational axis that is transverse to the first translational axis or a third translational axis that is transverse to the second translational axis; and a first electromechanical actuator coupled to the arm holder to drive the arm holder along the translational bearing surface in the first translational axis; a toe adjusting unit, the toe adjusting unit comprising: a tie rod mount at a distal end, configured to connect to an end of the tie rod; a telescoping rod configured to extend or retract in the distal-to-proximal direction; a second electromechanical actuator coupled to the telescoping arm and configured to drive rotation of the telescoping arm to extend or retract the telescoping arm relative to the tie rod; and a steering link mount at a proximal end, configured to connect to a linkage of a steering rack of the vehicle; and an electronic controller configured to operate the first and second electromechanical actuators.

The second electromechanical actuator may include an electric motor positioned in parallel with the telescoping arm. The steering link mount may be a ball joint. The telescoping arm may comprise a ball screw that rotates relative to a ball nut that is rigidly coupled with the tie rod mount, or any other linear actuator. The toe adjusting unit may include one or more stay rods connecting the second electromechanical actuator to the tie rod mount to prevent rotation of the second electromechanical actuator relative to the tie rod mount.

Thus, the electronic controller may coordinate adjustments of the toe when the camber is adjusted.

Also described herein are apparatuses for adjusting toe of a vehicle wheel, the apparatus comprising: an anterior tie rod; a tie rod mount rigidly connected to a distal end of the anterior tie rod; a telescoping rod in-line with the anterior tie rod and configured to extend or retract in the distal-to-proximal direction by rotating within the tie rod mount; an electromechanical actuator comprising an electric motor mounted in parallel with the telescoping rod and coupled to the telescoping rod through a gear set, wherein the electromechanical actuator is configured to drive rotation of the telescoping rod to extend or retract the telescoping rod relative to the anterior tie rod; and a steering link mount at a proximal end of the telescoping rod, wherein the steering link mount is configured to connect to a linkage of a steering rack of the vehicle. The apparatus may further comprise an electronic controller configured to operate the electromechanical actuator. The apparatus may also include a posterior tie rod coupled in-line between the telescoping rod and the steering link mount. The tie rod mount may be configured as a ball nut that mates with the telescoping rod, further wherein the telescoping rod is configured as a ball screw. The apparatus may also include one or more stays (e.g., stay rods) that are rigidly connected to the electromechanical actuator (e.g. electric motor), and are slideably connected to a bearing (e.g., loop, ring, channel, etc. within which they may move) that is rigidly connected to the tie rod mount (e.g., ball nut) which may hold the electromechanical actuator to prevent it from rotating about the telescoping rod as the device is actuated.

BRIEF DESCRIPTION OF THE DRAWINGS

FIGS. 12A-12G show an example of an electromechanical apparatus for controlling wheel alignment similar to that shown in FIGS. 4A-E. Specifically the apparatus of FIGS. 12A-12G is an apparatus for adjusting camber of a vehicle having a suspension with a strut. FIG. 12A shows a front perspective view of an apparatus for controlling camber mounted on the top of a strut of a MacPherson-type suspension. The device is configured to control the camber or castor of a MacPherson strut suspension system. FIG. 12B is a top perspective view of the apparatus of FIG. 12A mounted onto the top of a strut tower. FIG. 12C is a sectional view thorough the apparatus of FIG. 12B. FIG. 12D is a bottom perspective view of the apparatus of FIG. 12A shown with the outer housing removed and part of the suspension (and frame) removed. FIG. 12E is a top perspective view of the apparatus of FIG. 12D.

FIGS. 12F and 12G show alternative sectional views through the apparatus of FIG. 12A with and without a housing cover, respectively.

In FIGS. 13A-13H the apparatus is configured to control the toe of a wheel. FIGS. 13A-13B show perspective views of the toe controlling electromechanical apparatus. FIG. 13C is a section view through the electromechanical apparatus of FIGS. 13A-13B. FIG. 13D is a larger section view through a portion of the electromechanical apparatus of FIGS. 13A-13B. FIGS. 13E and 131F illustrate side and top perspective views, respectively, of the electromechanical apparatus of FIGS. 13A-13B. FIG. 13G is an enlarged left perspective view and FIG. 13F is an enlarged right perspective view of the same electromechanical apparatus.

DETAILED DESCRIPTION

Figure 1A:
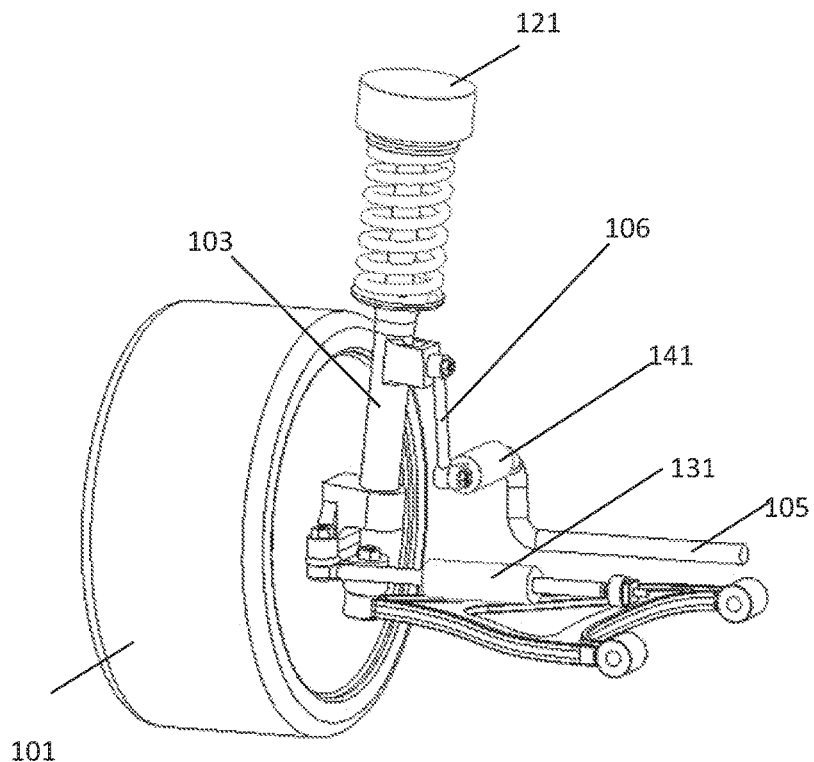
FIG. 1A shows an example of an apparatus (system) fitted to a MacPherson strut suspension system on a single wheel, configured as three devices.

In general, described herein are electromechanical apparatuses (devices, systems, assemblies, etc.) that may be used to adjust or control a vehicle suspension. In some embodiments, these apparatuses may be apparatuses for electrically adjusting wheel alignment (e.g., camber, toe, and/or castor). In some variations these apparatuses may be specific to one or more of camber, toe and/or caster; multiple apparatuses may be combined into a system, which may share a common controller that coordinates their operation.

Some of the apparatuses described herein, and particularly the camber-adjusting apparatuses, may couple between the frame of the vehicle and the suspension that is in turn coupled to the wheel. Thus a camber-adjusting apparatus may include a mount body that securely couples to the frame of the vehicle, and a holder (e.g., an arm holder) that couples to a portion of the suspension that is preferably close to the frame and further from the hub of the wheel. For example, the holder may be an arm holder that is configured to hold an end of an upper arm of the suspension, such as the strut of a MacPherson-type suspension, or an end of an upper wishbone of a double-wishbone type suspension. The holder may be coupled with or part of a linear stage; in general the holder is configured move in a first, e.g., linear, translational axis and may be constrained from moving in other linear directions. Movement is typically through a translational bearing surface over which the holder moves, and an electromechanical actuator is coupled directly or indirectly (e.g., through the linear stage) to the holder to move it backwards and forwards along the translational bearing surface in a first translational axis into a desired position, thereby adjusting the camber of the wheel.

The mount body may include two or more parts that connect together, such as a first (e.g., upper) mount body and a second (e.g., lower) mount body; the different portions may be configured to support different loads. For example, the second mount body may be configured to support high loads, while the first mount body may only have to support lighter loads, and may include the electromechanical actuator. Dividing the load carrying functions of the mount body may help isolate the electromechanical actuator from the otherwise larger load applied through the apparatus, so that the load seen by the actuator may be much smaller and more uniform.

Similarly, a toe-adjusting apparatus generally includes an elongate body having a telescoping rod that is coupled in-line with the tie rod (e.g., between the tie rod and the steering rack of the vehicle). The telescoping rod includes a mechanical linear actuator (such as a ball screw/ball nut) that is actuated by an electromechanical actuator. The elongate body forming the apparatus may also have two or more parts that connect together and separate out the loads on the apparatus. For example, the first part of the elongate body may connect to the electromechanical actuator and the second part of the elongate body includes the telescoping rod, connects in-line with the tie rod, and is configured to support much higher loads that the first part of the elongate body. For example, the first part of the elongate body may include a tie rod mount at one end and a steering link mount at the second end.

Other electromechanical apparatuses for controlling vehicle suspension settings are also described herein, and may be included as part of a system for modifying or controlling vehicle alignment (including alignment of one or more wheels). These apparatuses may share all or some features. For example, also described herein are apparatuses configured to control the stiffness settings of an anti-roll bar, and apparatuses configured to control the roll center settings of a vehicle, as well as methods of making and using them, controllers for controlling them, and systems including them. In general, these apparatuses may include one or more structural members configured to support the relevant static and dynamic loads of a vehicle, one or more adjustment members configured to control and alter suspension settings, and one or more drivers configured to drive translation of the adjustment member(s). In some cases adjustment members may also be configured as structural members, thereby both supporting the relevant loads of the vehicle and also controlling the suspension settings. In general, these apparatuses may be controlled via open-loop control or closed-loop control, or semi-closed loop (e.g., including user input, confirmation or selection). Any of these apparatuses may further include one or more sensors to monitor variables that may be useful for controlling suspension settings.

Figure 1B:
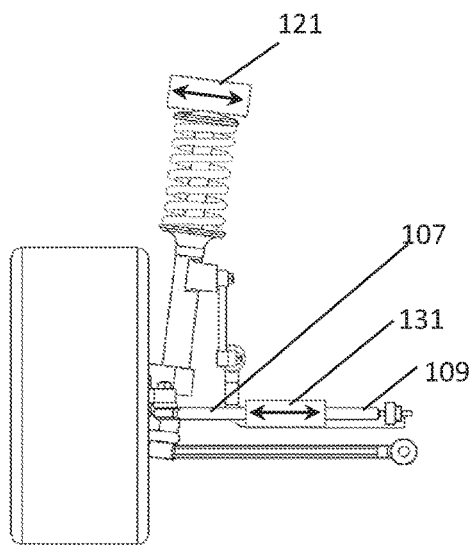
FIG. 1B shows a side view of the apparatus (system) shown in FIG. 1A.
Figure 1C:
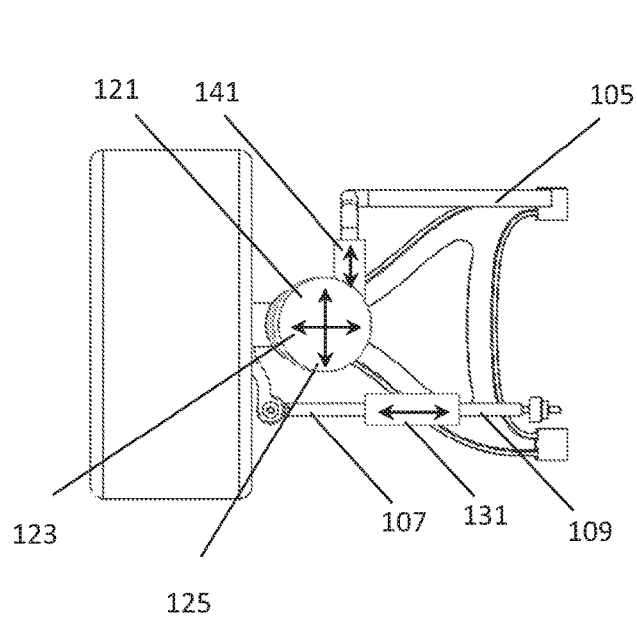
FIG. 1C shows a top view of the apparatus (system) shown in FIG. 1A.

FIGS. 1A-1C illustrate variations of electromechanical apparatuses for controlling vehicle suspension settings, the apparatuses shown are configured to be compatible with MacPherson strut suspension geometry. In this example, three electromechanical apparatus (e.g., devices) 121, 131, 141 control the suspension settings of one wheel 101 of a vehicle. The first electromechanical device 121 locates atop the strut 103 and is configured to control the camber and/or castor of the wheel 101. The second electromechanical device 131 locates between the outer tie rod 107 and the inner tie rod 109 (e.g., between the tie rod and the linkage of a steering rack) and is configured to control the toe of the wheel 101. The third electromechanical device 141 locates between the anti-roll bar 105 and a link 106 and is configured to control the stiffness of the anti-roll bar 105. In general, the toe adjusting apparatuses described herein may be used to replace a traditional tie rod with the electrically controlled (e.g., telescoping) apparatus that includes an anterior tie rod portion and a distal attachment and/or posterior tie rod portion. This is described in greater detail in FIGS. 13A-13H, below.

FIGS. 1B and 1C illustrate the axes in which the electromechanical devices 121, 131, 141 in this example control and adjust suspension settings. Electromechanical device 121 controls the camber and castor of the wheel 101 by translating the top of the strut 103 in two axes: one axis for camber 123, and one axis for castor 125. Electromechanical device 131 controls the toe of the wheel 101 by altering the distance between the outer tie rod 107 and the inner tie rod 109, thereby effectively altering the total length of the tie rod. Electromechanical device 141 controls the stiffness of the anti-roll bar 105 by altering the distance between the anti-roll bar 105 and the link 106, thereby effectively altering the length of the anti-roll bar 105.

Any of the electromechanical devices described herein may control one or more than one suspension setting, for one or more than one wheel. Any number of electromechanical devices may be used to control suspension settings for one or more than one wheel. A vehicle may be fitted with one or more electromechanical devices configured to control any number of suspension settings for any number of wheels. For a given wheel, one or more electromechanical devices may be configured to control all or only some suspension settings.

Any of the electromechanical devices described herein may be configured to be compatible with any suspension geometry or version of a suspension geometry, including (but not limited to) fixed axle, independent, MacPherson strut, wishbone, double-wishbone, multi-link, air suspension, leaf spring, and torsion bar suspension.

Figure 2A:
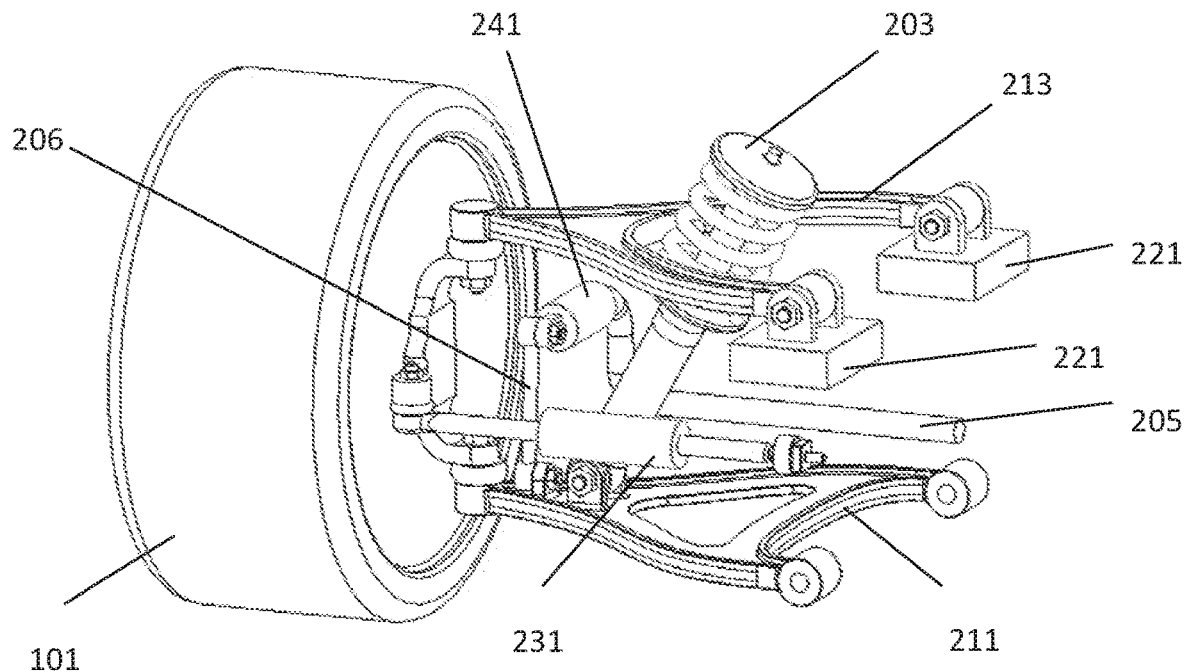
FIG. 2A shows an example of an apparatus (system) fitted to a double-wishbone suspension system on a single wheel, configured as four devices.
Figure 2B:
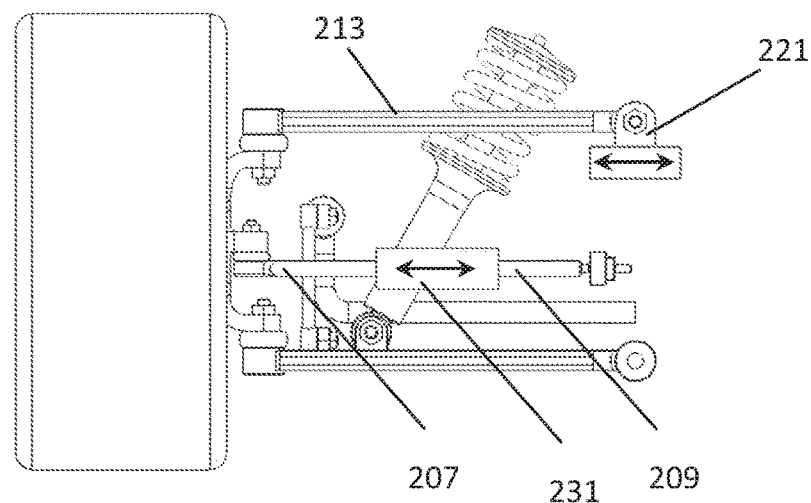
FIG. 2B shows a side view of the apparatus (system) shown in FIG. 2A.
Figure 2C:
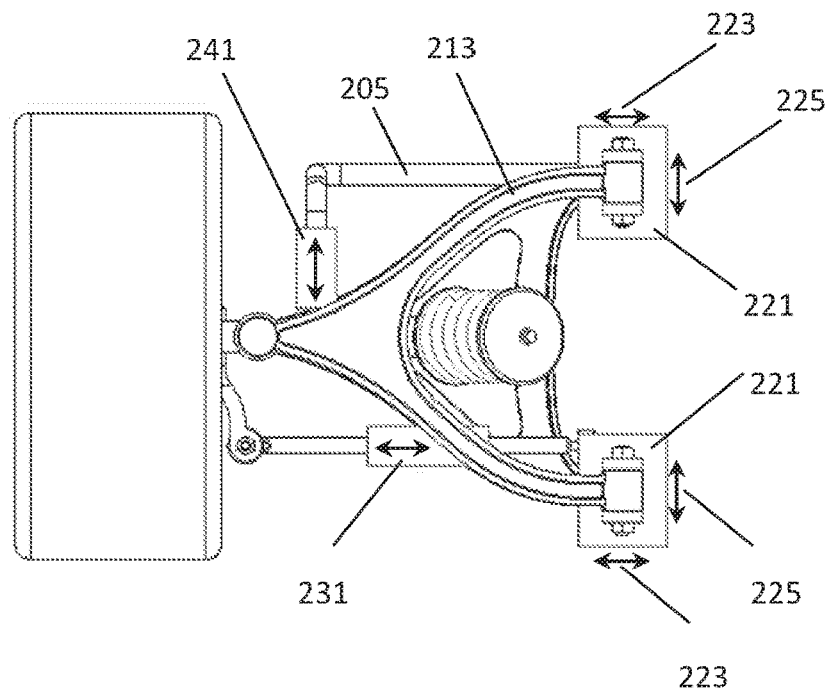
FIG. 2C shows a top view of the apparatus (system) shown in FIG. 2A.

FIGS. 2A-2C illustrate variations of electromechanical apparatuses for controlling vehicle suspension settings, the devices configured to be compatible with a double-wishbone type suspension geometry. In this example, four electromechanical devices 221, 231, 241 control the suspension settings of one wheel 101 of a vehicle. The first two electromechanical devices 221 are identical and locate at the inner pivot points of the upper wishbone 213, and are configured to control the camber and castor of the wheel 101. The third electromechanical device 231 locates between the outer tie rod 207 and the inner tie rod 209 and is configured to control the toe of the wheel 101. The fourth electromechanical device 241 locates between the anti-roll bar 205 and a link 206 and is configured to control the stiffness of the anti-roll bar 205.

FIGS. 2B and 2C illustrate the axes in which the electromechanical devices 221, 231, 241 in this example control and adjust suspension settings. Electromechanical devices 221 control the camber and castor of the wheel 101 by translating the upper wishbone 213 in two axes: one axis for camber 223, and one axis for castor 225. Electromechanical device 231 controls the toe of the wheel 101 by altering the distance between the outer tie rod 207 and the inner tie rod 209, thereby effectively altering the total length of the tie rod. Electromechanical device 241 controls the stiffness of the anti-roll bar 205 by altering the distance between the anti-roll bar 205 and the link 206, thereby effectively altering the length of the anti-roll bar 205.

Figure 3A:
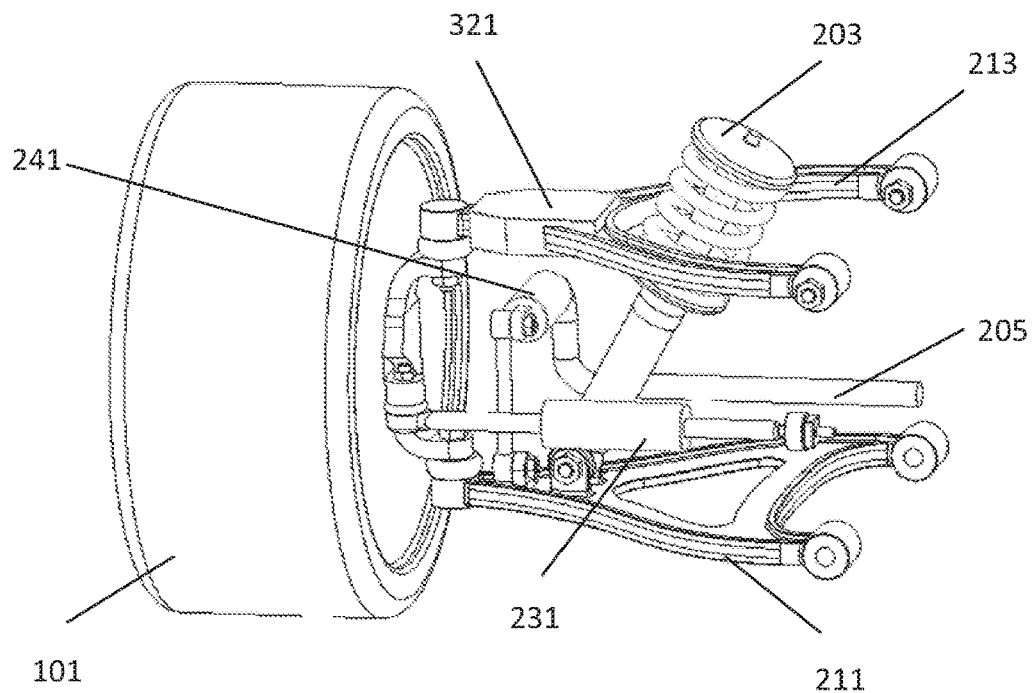
FIG. 3A shows another example of an apparatus (system) fitted to a double-wishbone suspension system on a single wheel, configured as three devices.
Figure 3B:
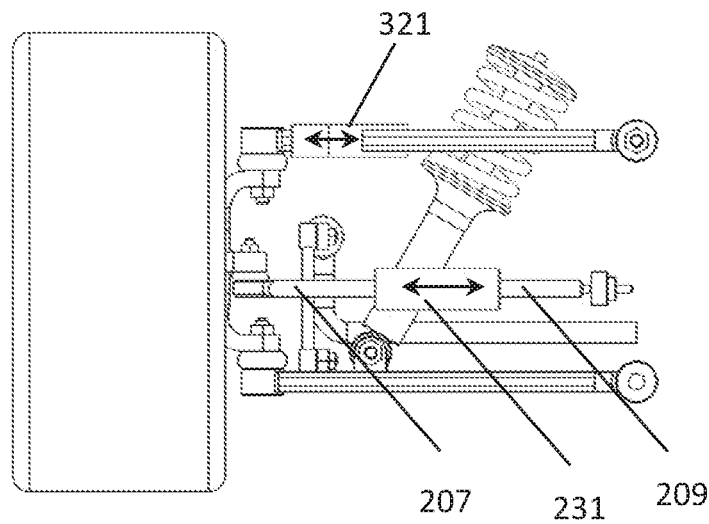
FIG. 3B shows a side view of the apparatus (system) shown in FIG. 3A.
Figure 3C:
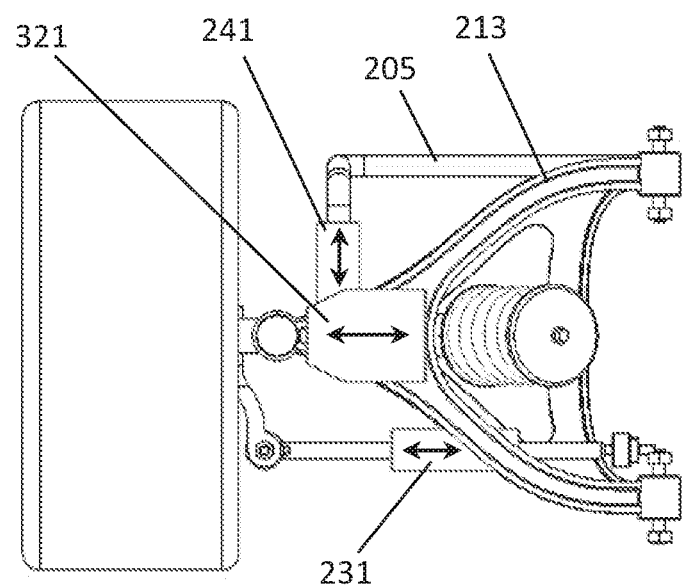
FIG. 3C shows a top view of the apparatus (system) shown in FIG. 3A.

FIGS. 3A-3C illustrate other variations of electromechanical devices for controlling vehicle suspension settings, the devices configured to be compatible with double-wishbone suspension geometry. In this example, three electromechanical devices 321, 231, 241 control the suspension settings of one wheel 101 of a vehicle. The first electromechanical device 321 locates near the outer pivot point of the upper wishbone 213, and is configured to control the camber of the wheel 101. The other two electromechanical devices 231, 241 are identical to those described in FIGS. 2A-2C. In this example, no control over the castor of the wheel 101 is provided.

FIGS. 3B and 3C illustrate the axes in which the electromechanical devices 321, 231, 241 in this example control and adjust suspension settings. Electromechanical device 321 controls the camber of the wheel 101 by translating the outer pivot point of the upper wishbone 213, thereby effectively altering the length of the upper wishbone 213. Electromechanical devices 231, 241 control the toe of the wheel 101 and stiffness of the anti-roll bar 205 as described in FIGS. 2B and 2C.

Any of the electromechanical devices described herein may be configured or located differently than illustrated in the herein examples provided they enable the control of one or more suspension settings. As illustrated in the example of FIGS. 3A-3C, a vehicle may be configured such that not all suspension settings are electromechanically controlled. In the example of FIGS. 3A-3C, the castor of the wheel is not controlled, while camber, toe and anti-roll bar stiffness are controlled.

In general, the electromechanical devices described herein may be configured to be compatible with the vehicle's original suspension system, or with an aftermarket suspension system, as desired, with minimal modification to the native geometry of the suspension system. This minimizes the potential for side-effects caused by introducing the electromechanical devices to an original suspension system (e.g. increased unsprung mass, reduced stiffness or rigidity, etc.). In general, the electromechanical devices described herein may be configured to be lightweight and strong, and may be located in locations that minimize potential increases in unsprung mass (for example, further from the hub of the wheel, closer to the vehicle frame, etc.).

Figure 4A:
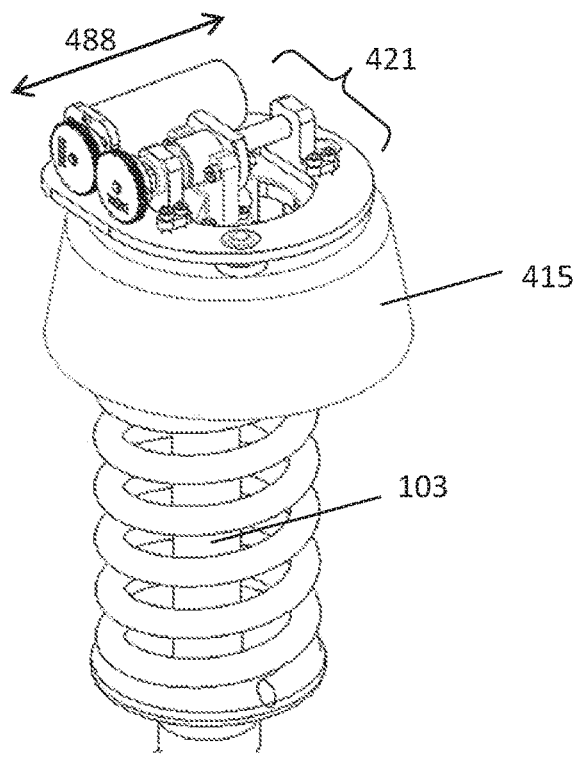
FIG. 4A is an example of an electromechanical device for controlling wheel alignment, the device configured to control the camber or castor of a MacPherson strut suspension system.
Figure 4B:
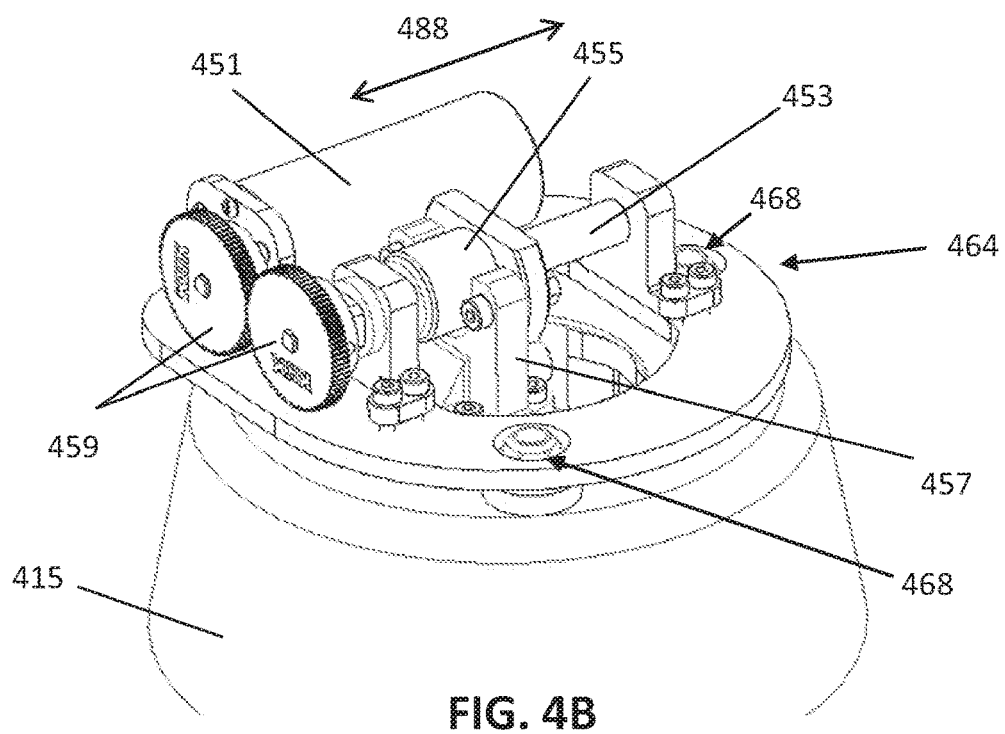
FIG. 4B is a close-up of the electromechanical device shown in FIG. 4A.
Figure 4C:
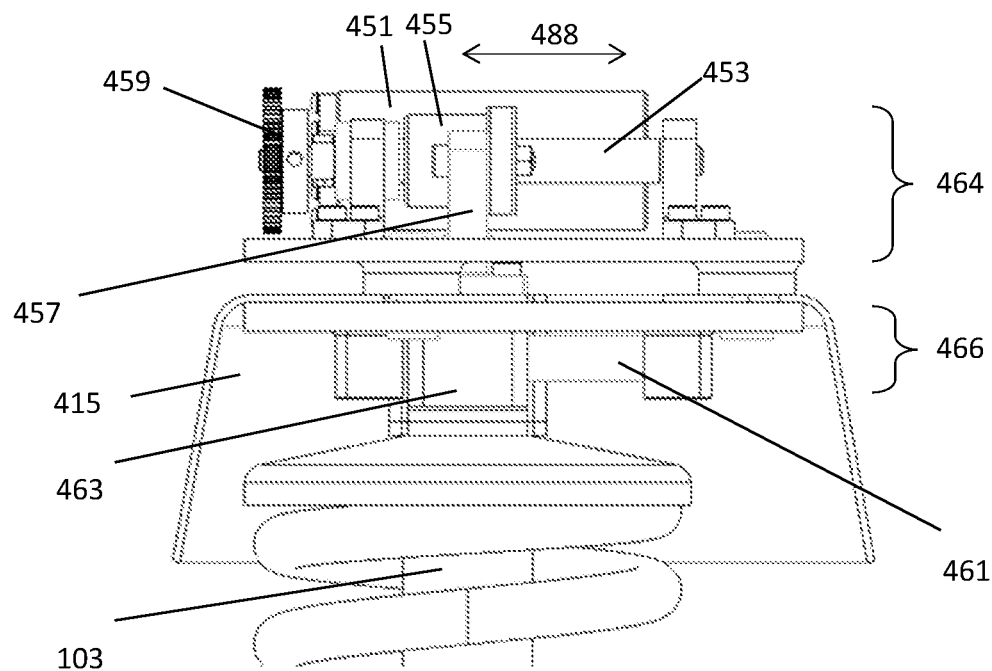
FIG. 4C is a side view of the electromechanical device shown in FIG. 3A, with the strut tower sectioned to show the device.
Figure 4D:
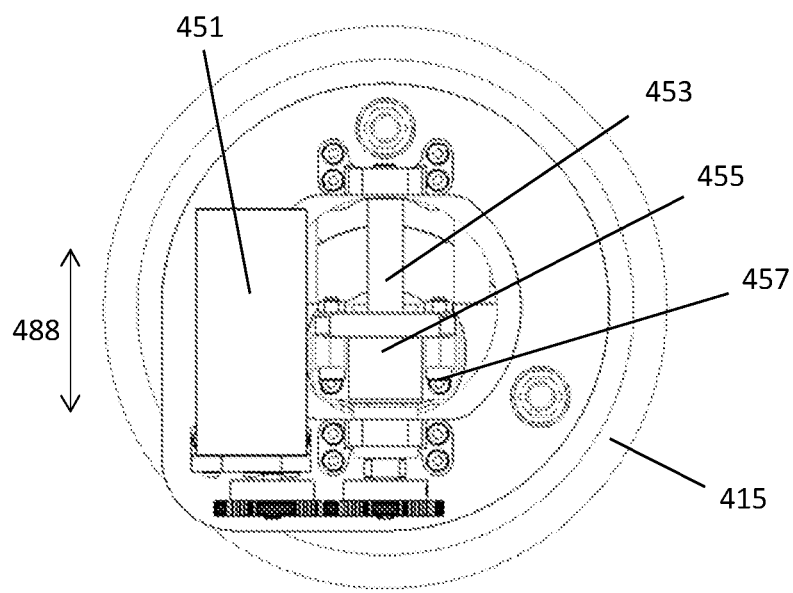
FIG. 4D is a top view of the electromechanical device shown in FIG. 4A.
Figure 4E:
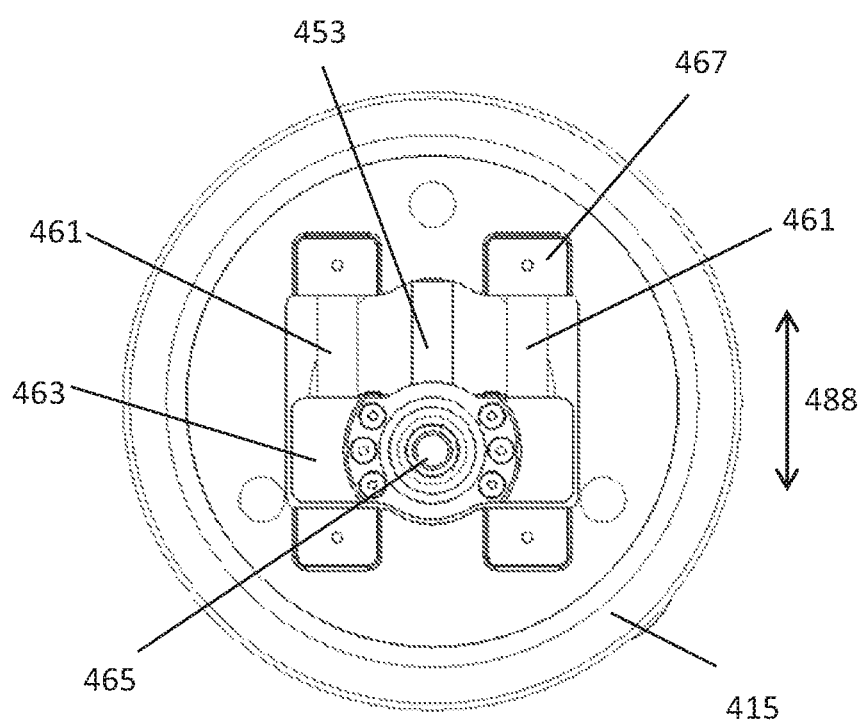
FIG. 4E is a bottom view of the electromechanical device shown in FIG. 4A.

FIGS. 4A-4E illustrate a variation of an electromechanical device for controlling vehicle suspension settings, the device configured to control the camber of a MacPherson strut suspension system. In FIG. 4A the apparatus (configured as an electromechanical device) 421 is located atop a strut 103 and mounts to a vehicle's strut tower 415, which is part of or connected to the vehicle frame. FIG. 4B is a close-up of the electromechanical device 421 illustrated in FIG. 4A. The apparatus includes a mount body having two parts that are secured to the vehicle frame (e.g., secured to the strut tower 415); in this example, the upper portion 464 of the mount body is connected above the frame 415 and the lower portion 466 is connected below the frame, bolts 468 are used to secure the two parts together with the frame rigidly held between the two parts. The apparatus also includes a strut holder 465 (configured as a spherical bearing) that is part of a lower translation stage 463. The strut holder can therefore move with the lower translation stage along a first translational axis 488 by translating back and forth over a translational bearing surface formed by the outer longitudinal surface of each of a pair of shafts configured as linear rails 461 on either side of the holder. The holder (strut holder) may be rigidly connected to one or more linear bearings (not shown) that ride on these linear rails. The electromagnetic actuator (including electric motor 451, spur gears 459, and a linear actuator including ball screw 453, and a ball nut 455) drive the holder back and forth in the first translational axis 488 to adjust the camber. FIGS. 4C, 4D and 4E are a partially sectioned side view, top view and bottom view, respectively, of the electromechanical device 421 illustrated in FIG. 4A.

Thus, the electromechanical device 421 includes an electric motor 451, two spur gears 459 (a set of gears), a ball screw 453, a ball nut 455, an upper translation stage 457, a lower translation stage 463 (the lower translation stage may be fixed to the upper translation stage and the two, along with the strut holder, move relative to the upper mount body portion), two linear rails 461 (forming the translational bearing surface, and may be part of the lower mount body portion) and a spherical bearing 465 (the strut holder in this example). The strut holder 465 may be rigidly or movably coupled to the top (e.g., the top end, also referred to as simply the end) of the strut 103. The top of the strut 103 in this example secures inside the holder (spherical bearing) 465, which is coupled with (e.g., housed within) the lower translation stage 463. The lower translation stage 463 slides along the linear rails 461 on linear bearings (not shown) with low sliding friction. Thus, the lower translation stage 463 rigidly connects to the upper translation stage 457, and the upper translation stage 457 rigidly connects to the ball nut 455. The ball nut 455 is configured to be driven back and forth along the ball screw 453 with low friction, thereby translating the upper translation stage 457, lower translation stage 463, strut holder (spherical bearing) 465 and top of the strut 103. As the bottom of the strut is secured to the wheel assembly (see FIG. 1A), translating the top of the strut 103 alters its angle and thereby alters the camber angle of the wheel 101. The ball screw 453 is supported by bearings capable of supporting radial and thrust loads (not shown), the ball screw 453 driven to rotate about its central axis by the spur gears 459, which are driven by the electric motor 451. In the variation shown in FIGS. 4A-4E, the strut holder is able to move in the first translational axis 488 (e.g., x), but is constrained from moving in any other translational axis relative to the mount body; specifically, a translational axis that is perpendicular to the first translational axis (z or y).

The electric motor 451 may be driven to rotate clockwise or counterclockwise, thereby translating the top of the strut 103 back and forth along the line of the ball screw 453. The electric motor 451 may be controlled by an electronic controller (not shown), and may include an encoder (not shown) to monitor the position of the motor 451 and/or the top of the strut 103. The electromechanical actuator or other portion of the apparatus may also include a lock that is releasable and, when engaged, locks the position of the strut holder relative to the mount body and therefore the vehicle frame. The lock may be a mechanical lock and the electronic controller controlling the electromechanical actuator may control engaging/disengaging (e.g., locking/unlocking) of the lock.

Although the examples shown above include an electric motor, any of the electromechanical devices described herein may include any one or more of any appropriate drivers, which may be (but not limited to) a mechanical actuator (e.g. motor, etc.), a pneumatic actuator, a hydraulic actuator, or an electrical actuator. Any driver may translate in rotation or in linear dimensions, or in rotation and in linear dimensions, and the translation may be reversible. Any driver may include a position sensor (e.g. encoder, etc.).

Any of the electromechanical devices described herein, and particularly the mount body, may include one or more structural members, which may be any appropriate type of structural member, including (but not limited to) a beam, flange, support, shaft, rail, rod, housing, stage, mount, bracket, bolt, nut, or screw (e.g. power screw, lead screw, ball screw, etc.). Structural members may remain stationary or may translate in rotation or in linear dimensions, or in rotation and linear dimensions.

Any of the electromechanical devices described herein may include one or more adjustment members, e.g., linear actuators, which may be any appropriate type of adjustment member, including (but not limited to) a screw (e.g. power screw, lead screw, ball screw, etc.), gear (e.g. spur gear, helical gear, worm gear, etc.), pulley, belt, shaft, slide, pivot, lever-arm, connecting rod, cam, translation stage, carriage, or nut (e.g. ball nut, etc.). The adjustment members may translate in rotation or in linear dimensions, or in rotation and linear dimensions.

Figure 5A:
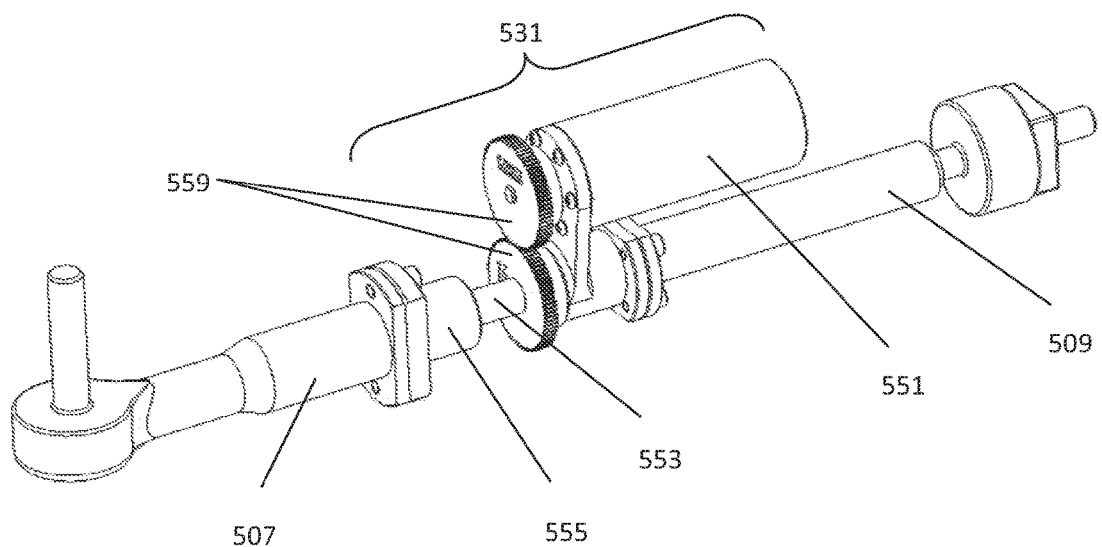
FIG. 5A is an example of an electromechanical device for controlling wheel alignment, the device configured to control the toe of a wheel.
Figure 5B:
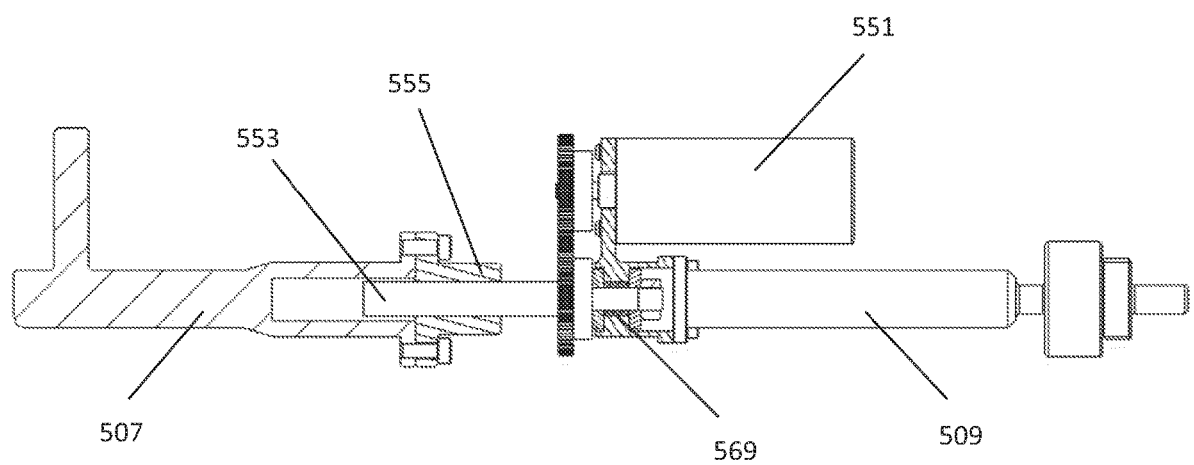
FIG. 5B is a partially sectioned side view of the electromechanical device in FIG. 5A.

FIGS. 5A and 5B illustrate a variation of an electromechanical device for controlling vehicle suspension settings, the device configured to control the toe of a wheel 101. In this example, an electromechanical device 531 locates between an outer tie rod 507 and an inner tie rod 509. The electromechanical device 531 includes an electric motor 551, two spur gears 559, a ball screw 553, a ball nut 555 and a bearing pack 569. The outer tie rod 507 connects to the ball nut 555, which is configured to be driven back and forth along the ball screw 553 with low friction, thereby translating the outer tie rod 507. As the outer tie rod 507 connects to the wheel assembly (see FIGS. 1A, 2A and 3A), translating the outer tie rod 507 alters the toe angle of the wheel 101. The ball screw 553 is supported by a bearing pack 569 capable of supporting radial and thrust loads, the ball screw 553 driven to rotate about its central axis by the setoff spur gears 559, which are driven by the electric motor 551.

Any of the electromechanical devices configured to control the toe of a wheel described herein may be configured to locate at any location between the steering box and the wheel of a vehicle. For example, an electromechanical device may locate at the outer end of an outer tie rod, between the outer tie rod and the wheel assembly. In another example, an electromechanical device may locate at the inner end of an inner tie rod, between the inner tie rod and the steering box. The electromechanical apparatus (e.g., the toe adjusting apparatus) may completely replace the tie rod, extending between the steering box and the wheel assembly, and may (as shown in FIGS. 13A-13H below) include one or more 'partial' tie-rods that are connected in line with a telescoping region. In general, an electromechanical device configured to control the toe of a wheel will alter the distance between the outer end of an outer tie rod and the inner end of an inner tie rod.

Thus, any of the electromechanical devices configured to control the toe of a wheel described herein may be configured to control the toe of a steered wheel or a non-steered wheel. For a non-steered wheel, an electromechanical device may be located at any location on a toe-arm. For example, an electromechanical device may locate at the outer end of a toe-arm, between the toe-arm and the wheel assembly. In another example, an electromechanical device may locate at the inner end of a toe-arm, between the toe-arm and the mounting point on the vehicle's body or chassis. In another example, an electromechanical device may completely replace the toe arm, extending between the mounting point on the vehicle's body or chassis and the wheel assembly. In general, an electromechanical device configured to control the toe of a non-steered wheel will alter the effective total length of a toe-arm.

Figure 6A:
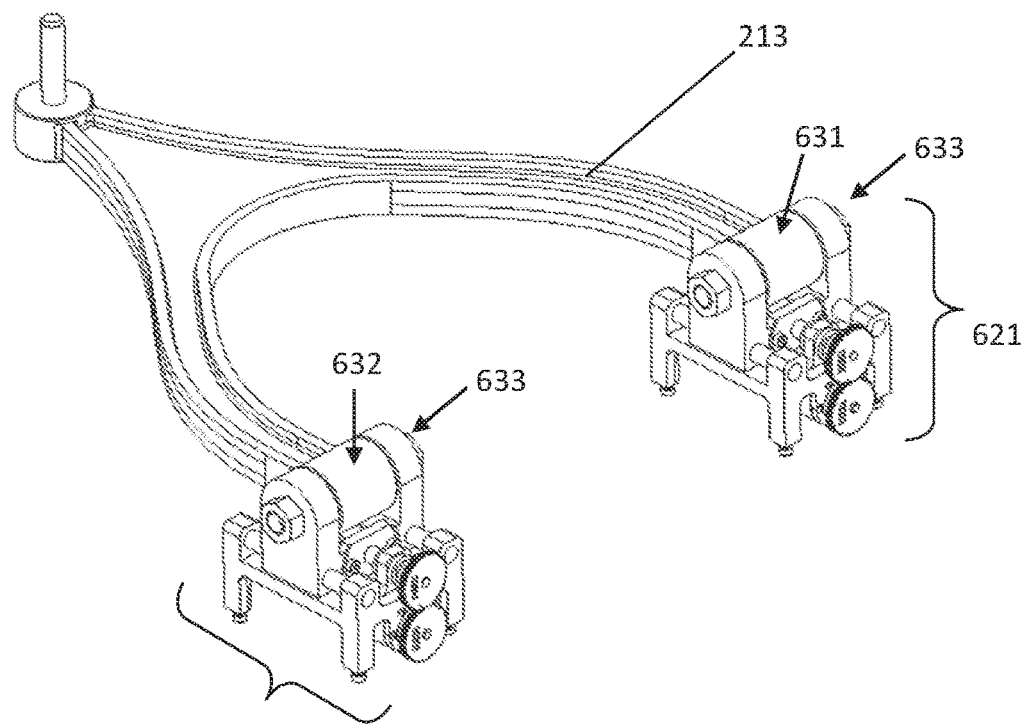
FIG. 6A is an example of an apparatus (system) for controlling wheel alignment, the system configured as two (identical) electromechanical devices to control the camber of a double-wishbone suspension system.
Figure 6B:
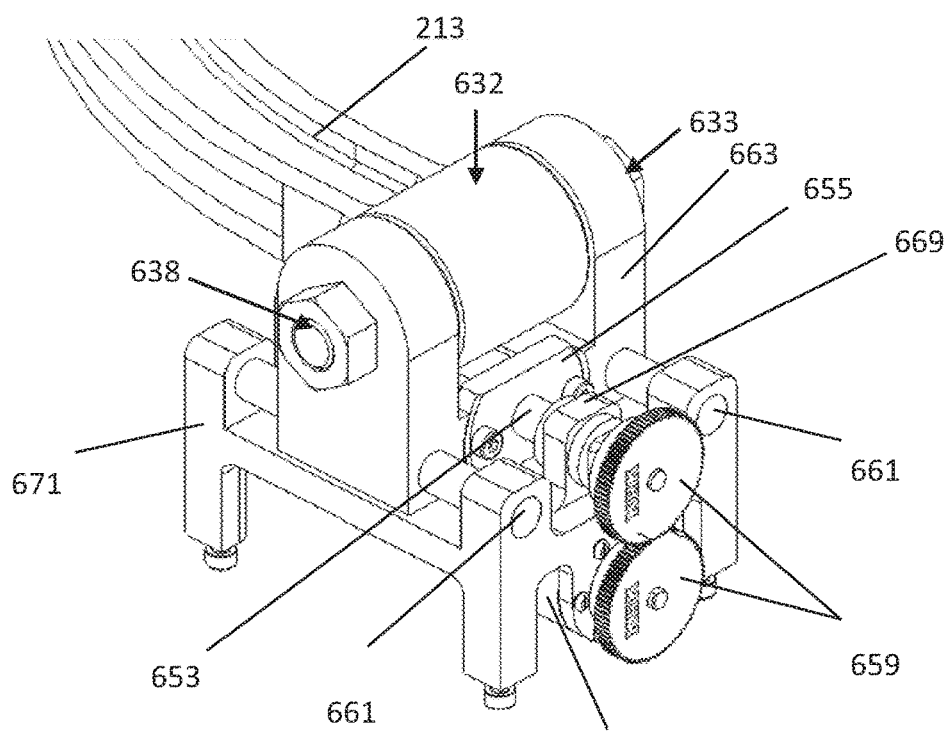
FIG. 6B is a close-up of one of the electromechanical devices shown in FIG. 6A.

FIGS. 6A and 6B illustrate a variation of an electromechanical device for controlling vehicle suspension settings, the device configured to control the camber of a double-wishbone suspension system. In this example, two identical electromechanical devices 621 locate at the inner pivot points of the upper wishbone 213, on the first 631 and second 632 ends, respectively of the upper wishbone 213. The ends of the wishbone are pivotably attached to the camber-adjusting apparatus through a pivoting joint with the wishbone arm holder 633 of the translation stage 633 of the apparatus, so that the wishbone arm may pivot relative to the wishbone arm holder. Each electromechanical device 621 includes an electromechanical actuator including an electric motor 651, two spur gears 659, a ball screw 653, and a ball nut 655. The apparatus also includes a translation stage 663 to which the wishbone arm holder 633 is connected (or in this example, integral with). The mount body 671 may couple to the frame (not shown) directly or indirectly, and may include or be rigidly connected to two linear rails 661 that form a translational bearing surface. The device also includes a bearing pack 669. The translational stage including the wishbone arm holder may also include a linear bearing (not shown) that rides on the translational bearing surface formed by the parallel pair of rails (shafts 661).

In this example, the wishbone arm holder of the translation stage is configured to hold an end of the upper wishbone arm; in this example the upper wishbone arm includes a channel into which a bolt or screw 638 may be attached to secure it in the wishbone arm holder. The upper wishbone 213 connects to the translation stage 663, which connects to the ball nut 655. The ball nut 655 is configured to be driven back and forth along the ball screw 653 with low friction, thereby translating the translation stage 663. As the upper wishbone 213 connects to the wheel assembly (see FIGS. 2A and 3A), translating the upper wishbone 213 alters the camber angle of the wheel 101. The ball screw 653 is supported by the bearing pack 669 capable of supporting radial and thrust loads, the ball screw 653 driven to rotate about its central axis by the set of spur gears 659, which are driven by the electric motor 651. In this example, the mount body, the shafts and the wishbone arm holder are configured to support a relatively high load (e.g., above a load threshold), while the electromechanical controller is mounted to the mount body and couples to the translation frame (e.g., wishbone arm holder) and does not need to support these high loads.

Figure 7A:
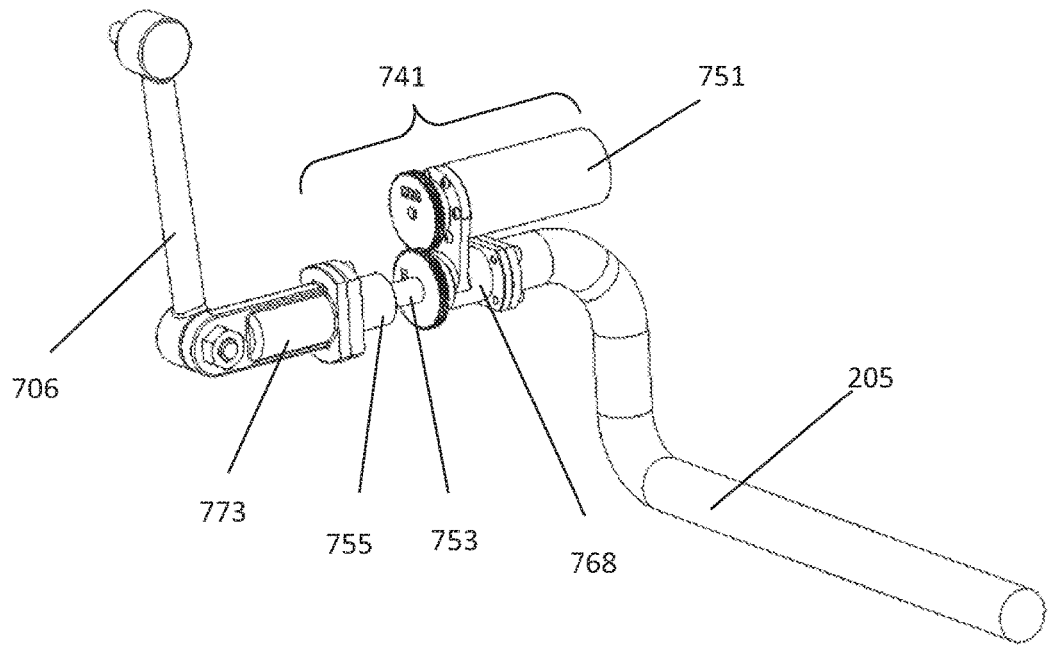
FIG. 7A is an example of an electromechanical device for controlling anti-roll bar stiffness.
Figure 7B:
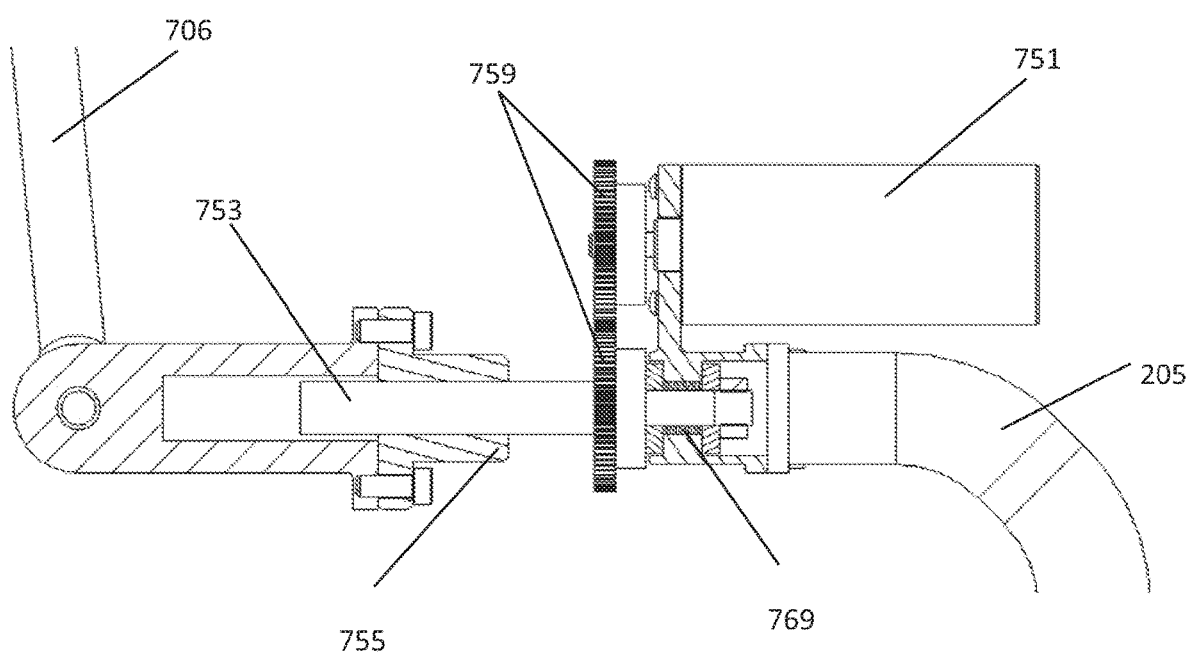
FIG. 7B is a partially sectioned side view of the electromechanical device in FIG. 7A.

FIGS. 7A and 7B illustrate a variation of an electromechanical device for controlling vehicle suspension settings, the device configured to control the stiffness of an anti-roll bar. In this example, an electromechanical device 741 locates between an anti-roll bar 205 and a link 706. The electromechanical device includes an electric motor 751, two spur gears 759, a ball screw 753, a ball nut 755, a connecting flange 773, a mount 768 and a bearing pack 769. The mount 768 connects to the end of the anti-roll bar 205, the mount 768 housing the bearing pack 769. The ball screw 753 is supported by the bearing pack 769, which is capable of supporting radial and thrust loads. The ball screw 753 is driven to rotate about its central axis by the spur gears 759, which are driven by the electric motor 751. The ball nut 755 is configured to be driven back and forth along the ball screw 753 with low friction, thereby translating the connecting flange 773 and altering the distance between the end of the anti-roll bar 205 and the link 706. This distance between the end of the anti-roll bar 205 and the link 706 represents an effective length of the anti-roll bar 205. If the effective length of the anti-roll bar 205 is higher, the stiffness of the anti-roll bar 205 will be lower. In contrast, if the effective length of the anti-roll bar 205 is lower, the stiffness of the anti-roll bar 205 will be higher.

Any of the electromechanical devices configured to control the stiffness of an anti-roll bar described herein may be configured to locate at any location on an anti-roll bar, or at any location between an anti-roll bar and a wheel or suspension assembly. An electromechanical device may connect indirectly to a wheel or suspension assembly (e.g. via a link, etc.), or may connect directly to a wheel or suspension assembly.

Any of the electromechanical devices configured to control the stiffness of an anti-roll bar described herein may be configured to control the stiffness of any anti-roll bar, including (but not limited to) a front anti-roll bar or a rear anti-roll bar.

Figure 8A:
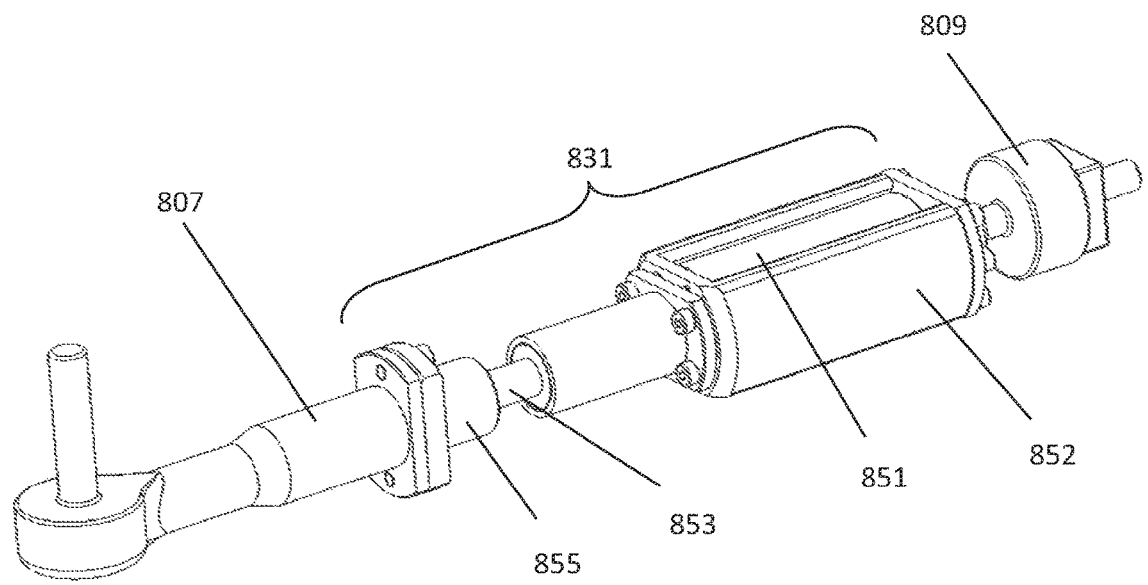
FIG. 8A is another example of an electromechanical device for controlling wheel alignment, the device configured to control the toe of a wheel.
Figure 8B:
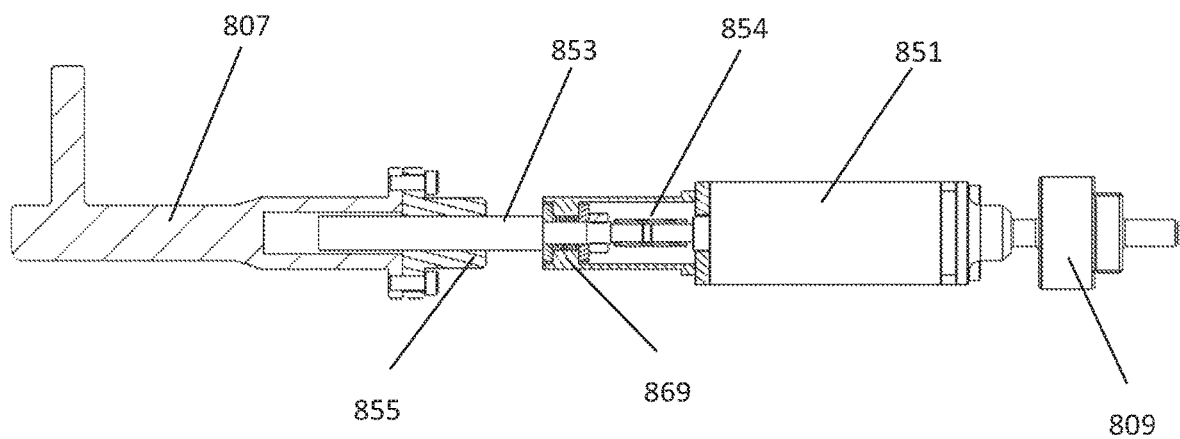
FIG. 8B is a partially sectioned side view of the electromechanical device in FIG. 8A.

FIGS. 8A and 8B illustrate another variation of an electromechanical device for controlling vehicle suspension settings, the device configured to control the toe of a wheel 101. In this example, an electromechanical device 831 locates between an outer tie rod 807 and an inner tie rod 809. The electromechanical device includes an electric motor 851, a motor housing 852, a ball screw 853, a shaft coupler 854, a ball nut 855 and a bearing pack 869. The outer tie rod 807 connects to the ball nut 855, which is configured to be driven back and forth along the ball screw 853 with low friction, thereby translating the outer tie rod 807. As the outer tie rod 807 connects to the wheel assembly (see FIGS. 1A, 2A and 3A), translating the outer tie rod 807 alters the toe angle of the wheel 101. The ball screw 853 is supported by a bearing pack 869 capable of supporting radial and thrust loads, the ball screw 853 driven to rotate about its central axis by the electric motor 851 via a shaft coupler 854. In this example, as the electric motor 851 output shaft couples directly to the ball screw 853 via a shaft coupler 854, no gears or the like are needed.

Any of the electromechanical devices described herein may or may not include gears for driving adjustment members to adjust suspension settings. Where gears are used, they may have any gearing ratio (e.g. 1:1, 1:2, 2:1, 1:3, 1:4, etc.). The output shaft of any driver of any electromechanical device described herein may be coupled directly to any adjustment member. Where a screw (e.g. ball screw, lead screw, etc.) is included in any electromechanical device described herein, the output shaft of the at least one driver may be coupled directly or indirectly to the screw, and furthermore the output shaft of the at least one driver may take any spatial orientation relative to the screw, including being parallel, perpendicular, co-linear, coincident, or at any angle to the screw.

Any of the electromechanical devices described herein may be controlled by an electronic controller. Each electromechanical device may be controlled by its own control system, by another device's control system, by a common, centralized control system, or by a combination of control systems.

Figure 9:
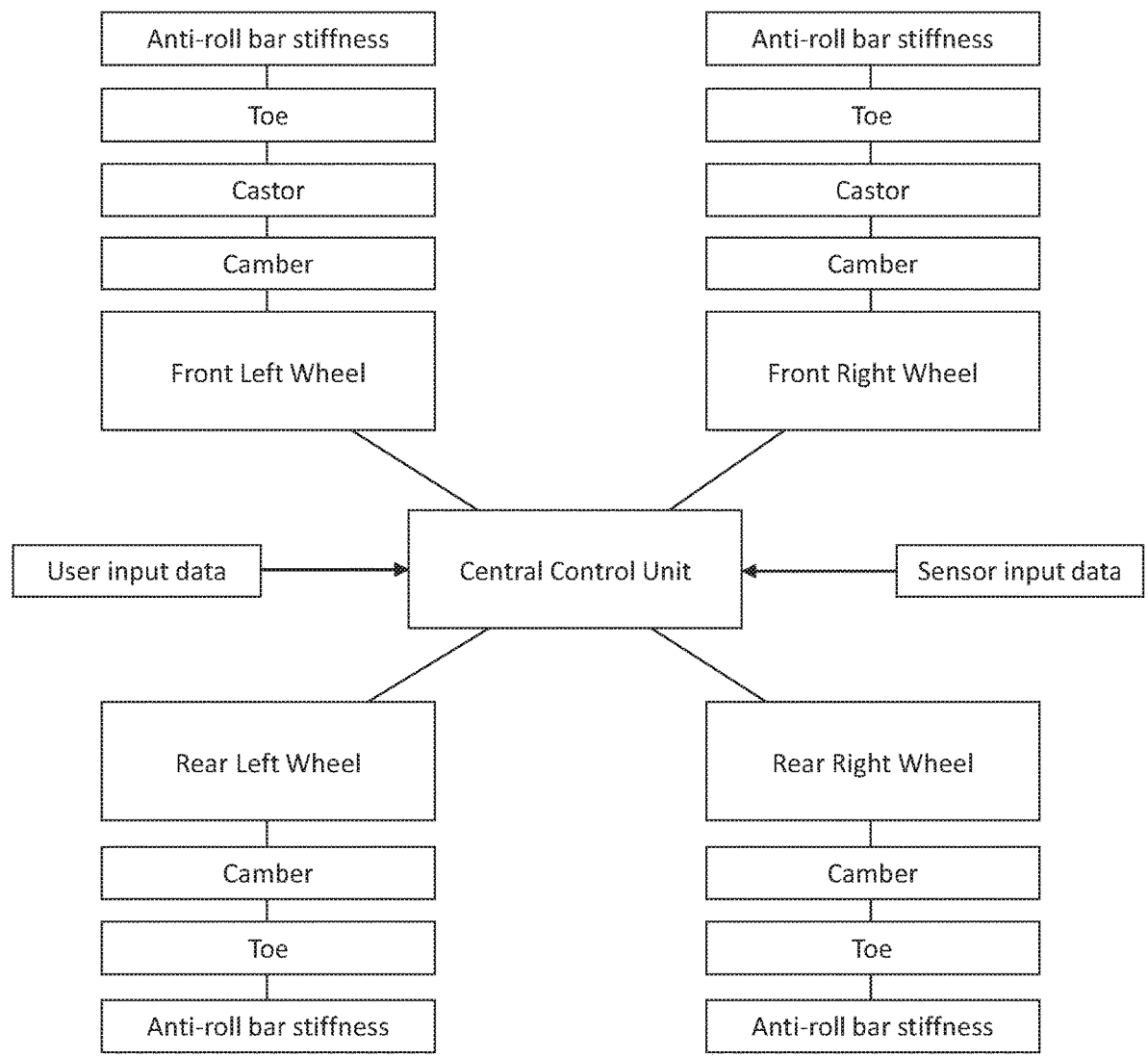
FIG. 9 is an example of a central control unit, configured to control multiple devices fitted to a vehicle.

FIG. 9 illustrates a variation of a control unit configured to control electromechanical devices for controlling vehicle suspension settings. In this example, a central control unit is used to control all electromechanical devices fitted to all four wheels of a vehicle. One or more electromechanical devices are fitted to each of the front left wheel and front right wheel to control the camber, castor, toe and anti-roll bar stiffness of each front wheel. Further, one or more electromechanical devices are fitted to each of the rear left wheel and rear right wheel to control the camber, toe and anti-roll bar stiffness of each rear wheel. The central control unit is configured to receive user input data and sensor input data, and output control signals to all electromechanical devices in order to control and alter suspension settings as appropriate.

Any control unit described herein may additionally control other suspension or vehicle functions not relating to the electromechanical devices described herein, including (but not limited to) magnetic dampers, adaptive dampers, spring rates, and roll centers.

Any of the electromechanical devices described herein may include one or more sensors, and may further include closed-loop control.

Figure 10A:
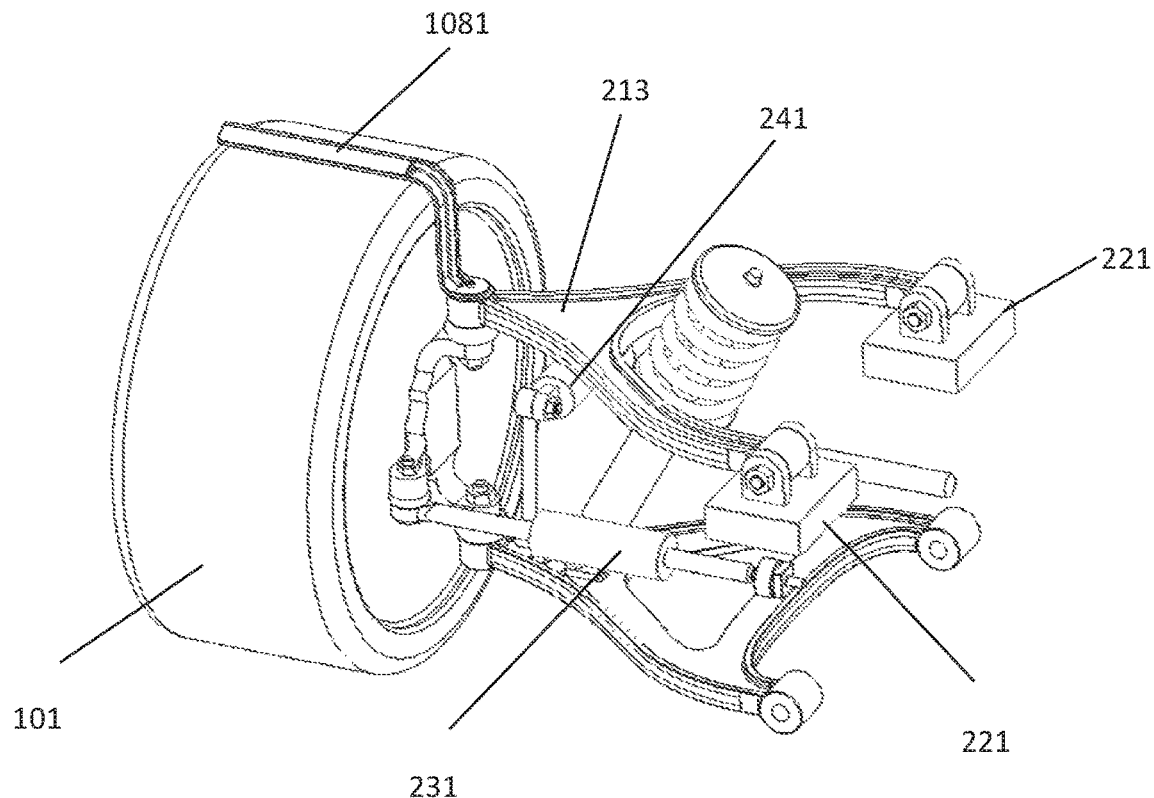
FIG. 10A is an example of an apparatus (system) fitted to a single wheel, including a sensor array to measure tire temperature.
Figure 10B:
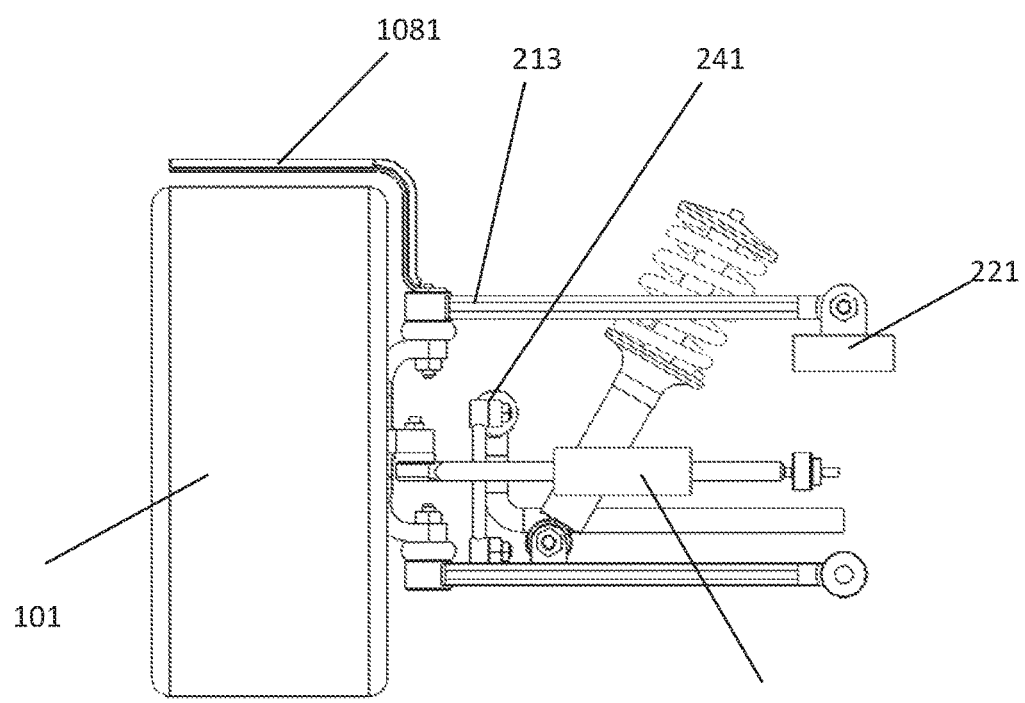
FIG. 10B shows a side view of the apparatus (system) shown in FIG. 10A.

FIGS. 10A and 10B illustrate variations of electromechanical devices for controlling vehicle suspension settings, configured with feedback sensors. Four electromechanical devices 221, 231, 241 control the suspension settings of one wheel 101 of a vehicle, as described in FIGS. 2A-2C. In this example, a temperature sensor array 1081 mounts to the upper wishbone 213 and locates above the surface of the tire on the wheel 101 to monitor the temperature of the tire. The temperature sensor array 1081 includes one or more temperature sensors along its length to monitor the temperature of the tire from the inner edge to the outer edge, or from the outer edge to the inner edge.

In one example, the temperature sensor array 1081 may include two discrete sensors, one located above the inner edge of the tire to monitor the temperature of the inner edge, and one located above the outer edge of the tire to monitor the temperature of the outer edge.

In another example, the temperature sensor array 1081 may include three discrete sensors, one located above the inner edge of the tire to monitor the temperature of the inner edge, one located above the center of the tire to monitor the temperature of the center, and one located above the outer edge of the tire to monitor the temperature of the outer edge.

In yet another example, the temperature sensor array 1081 may include one continuous sensor bar to monitor the temperature at all points across the tire and provide a complete temperature profile.

Any of the electromechanical devices or systems of devices described herein may include one or more temperature sensors. In particular, temperature sensors may be used to assess the appropriateness of a given set of suspension settings. In particular, temperature sensors may be used to monitor the temperature of the tire surface and thereby assess the appropriateness of a given camber setting. For example, if the temperature of the outer edge of a tire is higher than the temperature of the inner edge, an electromechanical device configured to control camber can be commanded to provide more negative (or less positive) camber. In another example, if the temperature of the inner edge of a tire is higher than the temperature of the outer edge, an electromechanical device configured to control camber can be commanded to provide less negative (or more positive) camber.

Figure 11A:
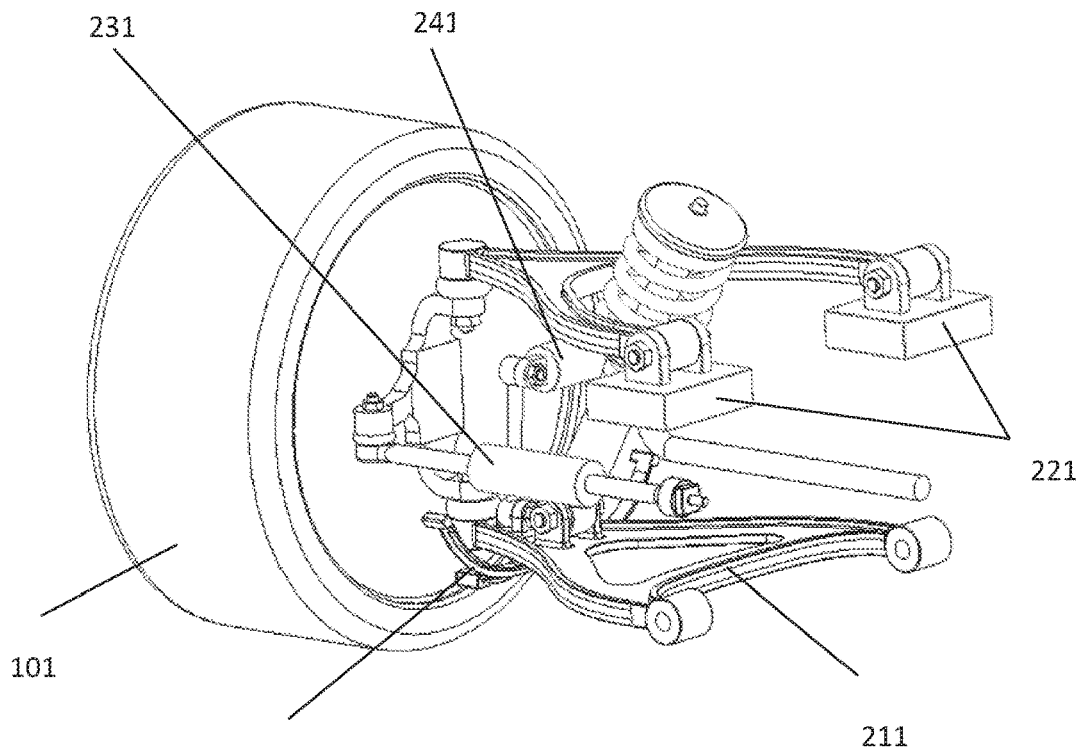
FIG. 11A shows an example of an apparatus (system) fitted to a single wheel, including a sensor array to measure wheel angles.
Figure 11B:
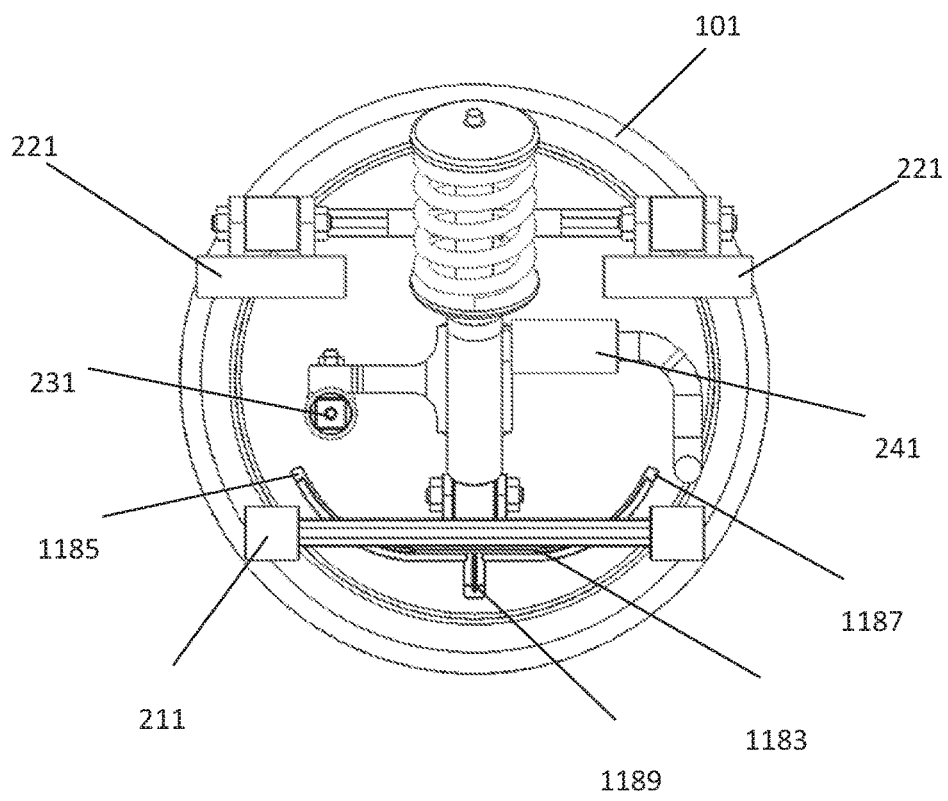
FIG. 11B shows a side view of the apparatus (system) shown in FIG. 11A.

FIGS. 11A and 11B illustrate variations of electromechanical devices for controlling vehicle suspension settings, configured with feedback sensors. Four electromechanical devices 221, 231, 241 control the suspension settings of one wheel 101 of a vehicle, as described in FIGS. 2A-2C. In this example, a position sensor array 1183 mounts to the lower wishbone 211 and locates behind the wheel 101 to monitor the angle or position of the wheel 101. The position sensor array 1183 in this example includes three position sensors 1185, 1187, 1189. The position sensors 1185, 1187, 1189 are configured to monitor the camber angle and toe angle of the wheel 101.

In one example, a position sensor array may include one or more discrete sensors. In another example, a position sensor array may include one continuous sensor bar to provide a position profile.

Any of the electromechanical devices or systems of devices described herein may include one or more position sensors. In particular, position sensors may be used to assess the appropriateness of a given set of suspension settings. In particular, position sensors may be used to monitor the toe angle of a wheel.

Any of the electromechanical devices or systems of devices described herein may include one or more sensors of one or more types, including (but not limited to) position sensors, encoders (e.g. linear, rotary, optical, etc.), limit switches, proximity sensors, temperature (thermal) sensors, reed switches, light sensors (e.g. ultraviolet, infrared, etc.), and accelerometers. For example, an electromechanical device may include one or more position sensors and one or more temperature sensors.

For any of the electromechanical devices or systems of devices including one or more sensors described herein, open-loop, partial closed-loop, full closed-loop, intermittent closed-loop, continuous closed-loop, semi-automatic, or fully-automatic control may be provided.

For any of the electromechanical devices or systems of devices including one or more sensors described herein, automatic, continuous, real-time control of suspension settings may be provided.

Figure 12D:
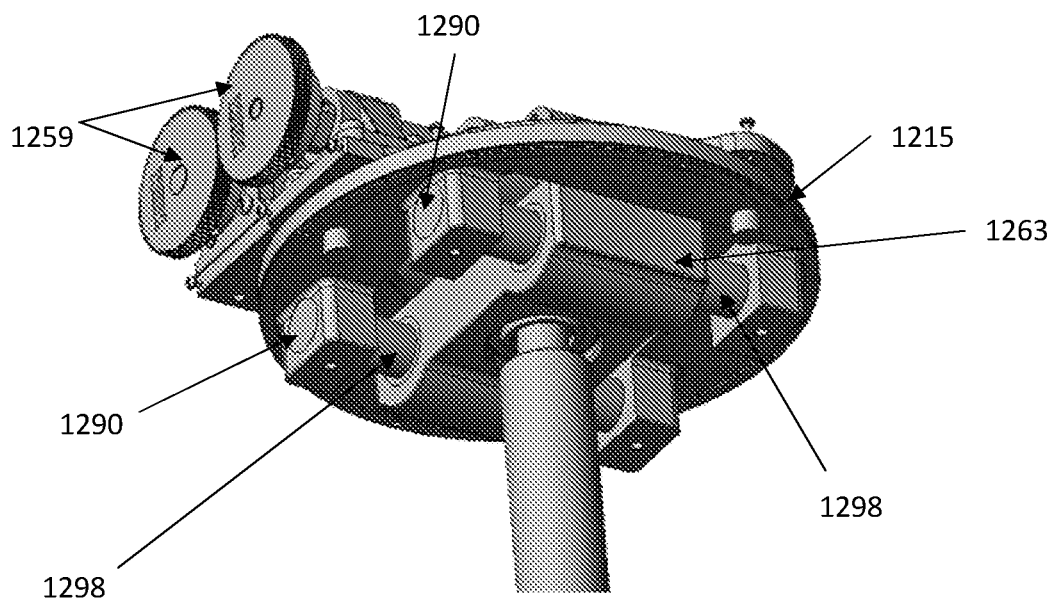
Figure 12E:
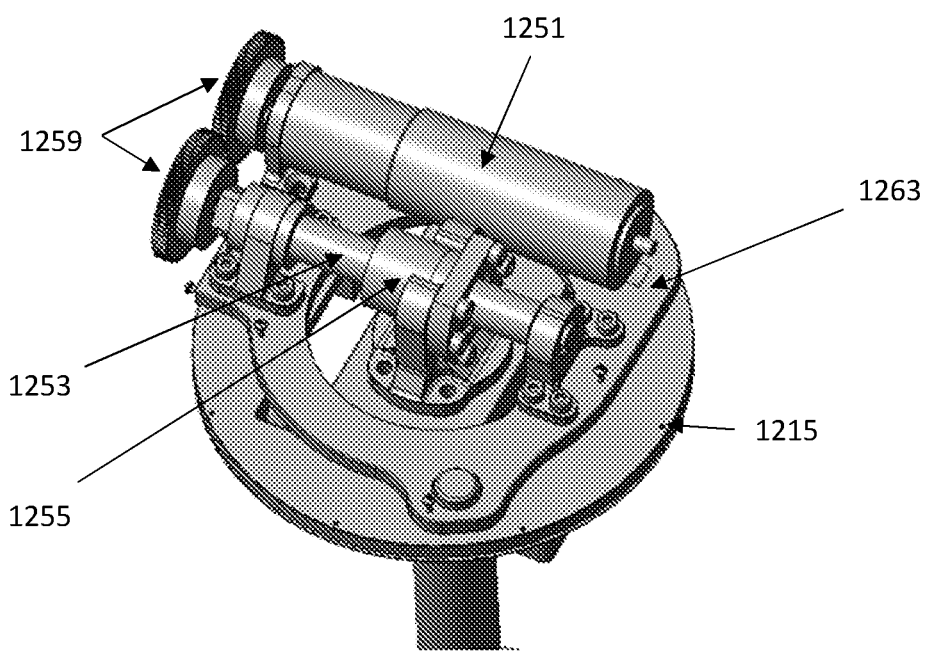
Figure 12F:
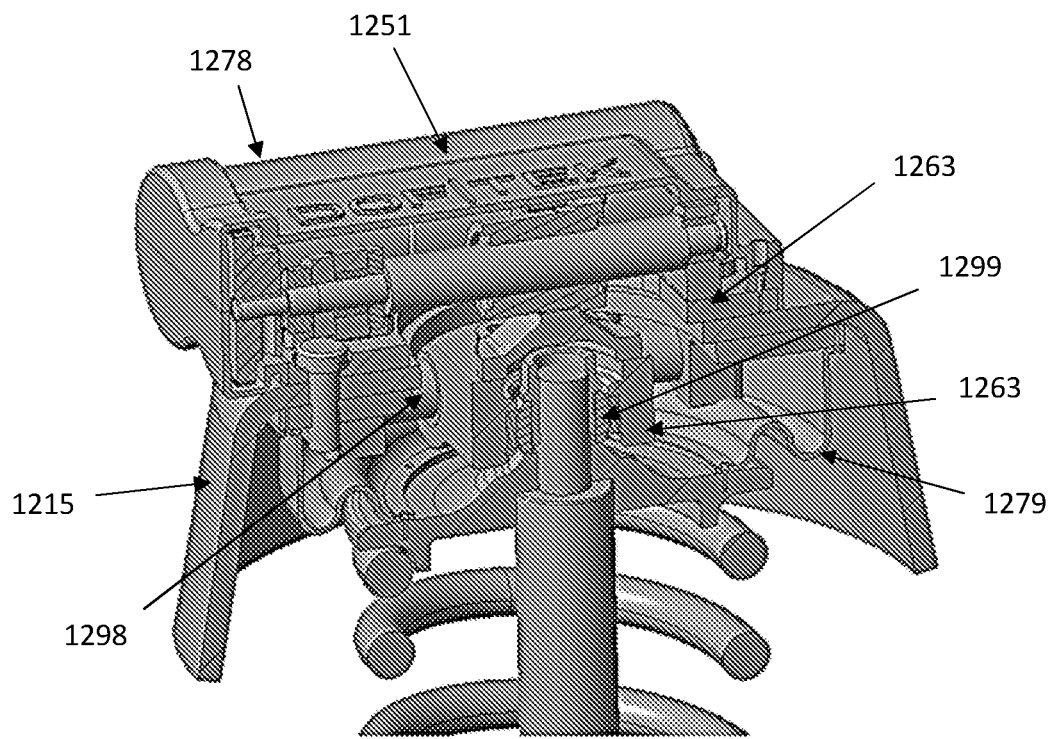
Figure 12G:
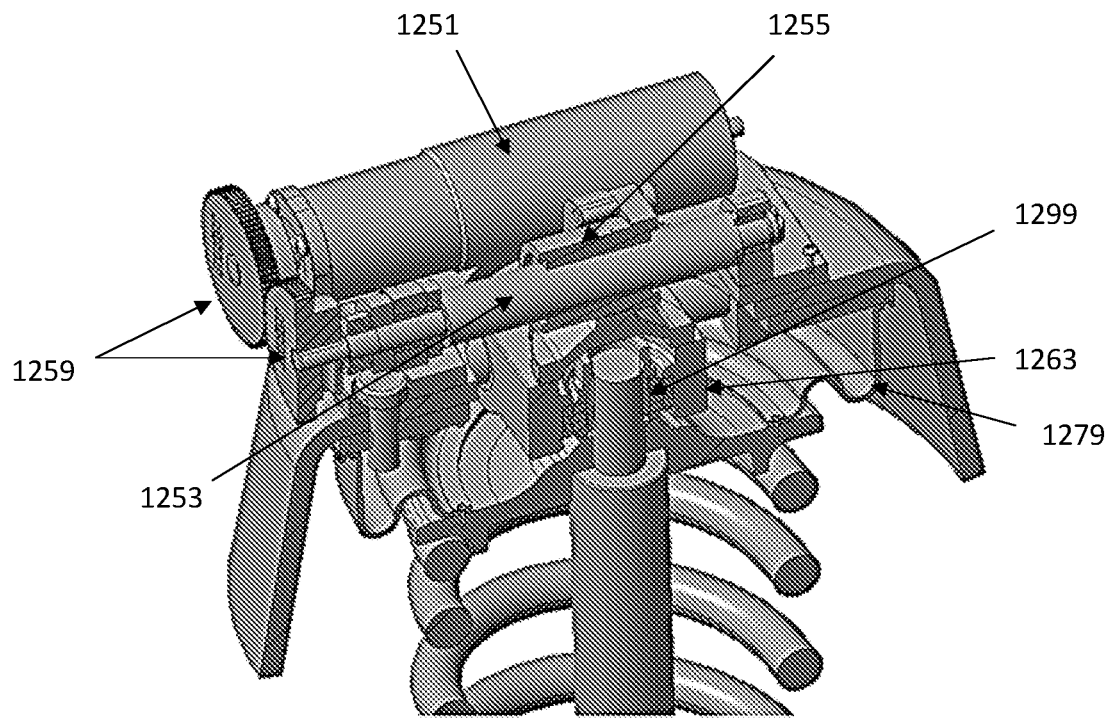

FIGS. 12A-12G show another variation of an apparatus 1221 (e.g., device, system, etc.) for adjusting camber of a vehicle having a suspension that includes a strut 1203, such as a MacPherson-type suspension. In this example, similar to the apparatus shown in FIGS. 4A-4E, the apparatus includes a mount body that rigidly connects to the vehicle frame (e.g., a strut tower 1215). The mount body includes an upper mount body 1264 and a lower mount body 1266. The upper mount body is configured to connect to the lower mount body, in this example, to hold the frame of the vehicle 1215 between the two, so that the two portions of the mount body are rigidly connected, as shown in FIG. 12C. An opening on each of the upper and lower mount bodies aligns with an opening through the frame (strut tower 1215). The lower mount body spans across this opening and the strut holder 1299, which is connected or formed as part of a movable translation stage 1263, moves in a single translational axis on a translational bearing surface 1298 that forms part of the lower mount body. In this example, the translational bearing surface is the cylindrical outer surface of each of two shafts 1290 that extend in parallel across the opening. The translational axis extends in parallel to the direction of these shafts. In FIGS. 12A, 12C and 12F, a housing 1278 covers the upper mount body, and a flexible sleeve 1279 covers the lower mount body, allowing movement of the strut holder and protecting the apparatus from debris.

The upper housing 1278 in this example covers the electromechanical actuator; in FIGS. 12B, 12D, 12E and 12G, the upper cover has been removed (though the lower, flexible, cover 1279 is still in place). The electromechanical actuator in this example includes an electric motor 1251 that drives rotation of a pair of gears 1259, which couple with the linear actuator, configured here as a ball screw 1253 and ball nut 1255. The ball screw is rotated by the gears, so that the ball nut may travel forwards and backwards along the ball screw; since the ball nut is connected (e.g., rigidly connected) to the translation stage/strut holder, rotation of the ball screw drives movement of the strut holder. An electric controller (not shown) communicates with and controls operation of the electromechanical actuator.

In operation, the strut holder is driven by the electromechanical actuator so that it moves on the translational bearing surface 1298 of the pair of shafts (e.g., by action of a bush/linear bearing on/in or part of the translation stage) when the electric motor of the electromechanical actuator rotates the ball screw and moves the ball nut forwards or backwards in the first translational axis. In this example, this first translational axis is generally aligned into the plane of the wheel (e.g., in some variations within +/−30 degrees of the rotational axis of the wheel). The apparatus is constrained so that the translation stage, and therefore the strut holder, is constrained in all other translational directions (e.g., axes perpendicular to the first translational axis). An encoder (not shown) may monitor the position of the holder/translation stage and may provide feedback to the electrical controller.

As described above, the apparatus shown in FIGS. 12A-12G is configured so that the high loads paced on the apparatus by, e.g., the strut of the suspension are transferred to the frame body through a separate portion of the mount body that is isolated from the portion of the mount body supporting or including the electromechanical actuator. In this example, the upper mount body 1263 supports the electromechanical actuator, and does not need to support a high load; the electromechanical actuator does not need to operate under the high load conditions that the lower mount body 1266 does. The lower mount body 1266 supports the load from the strut 1203, and this load is transmitted through the strut holder 1299 and translation stage 1263 to the pair of shafts forming the translational bearing surface 1298 of the lower mount body 1266. The lower mount body is configured to mount under the vehicle frame (e.g., the strut tower 1215), and thus this load is transferred through the device to the frame without passing through the electromechanical actuator. Thus, the lower mount body may be configured to handle a minimum load threshold of greater than about 1000 kilograms (kg) (e.g., about 1500 kg or more, about 2000 kg or more, about 2500 kg or more, about 3000 kg or more about 3200 kg or more, about 3500 kg or more, about 4000 kg or more, etc.).

Figure 13A:
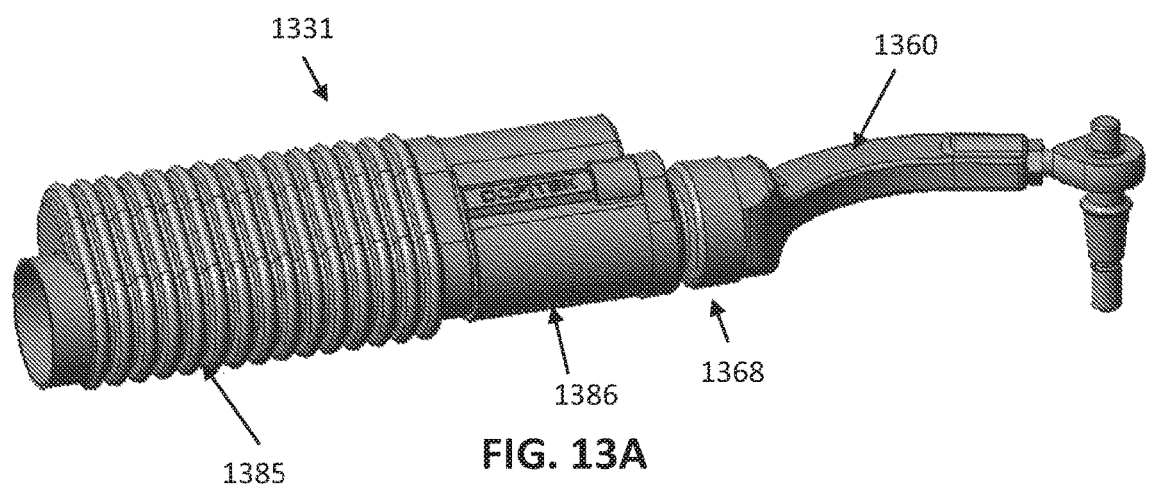
FIGS. 13A-13H illustrate an example of an electromechanical apparatus for controlling wheel alignment, similar to that shown in FIG. 5A-5B.
Figure 13B:
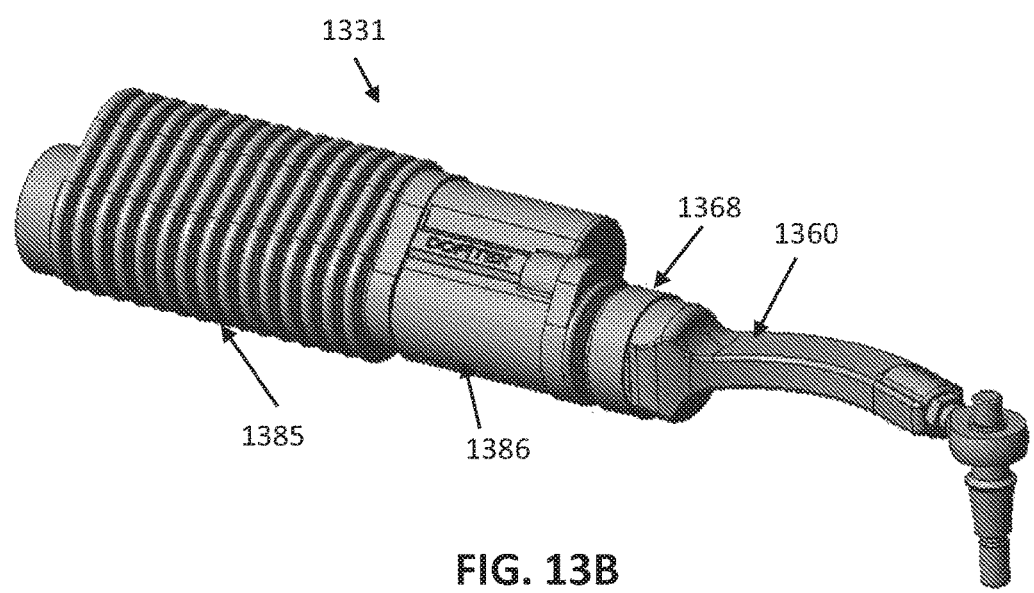
Figure 13C:
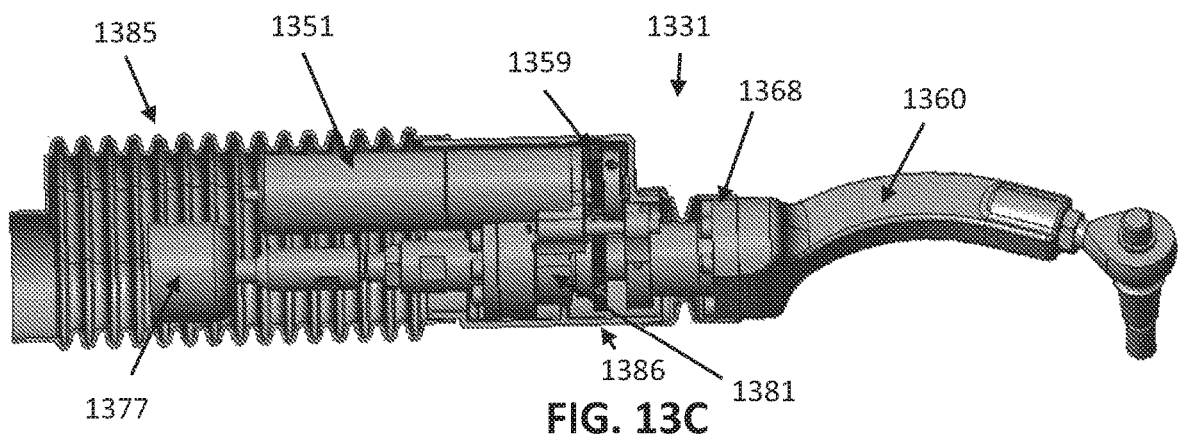
Figure 13D:
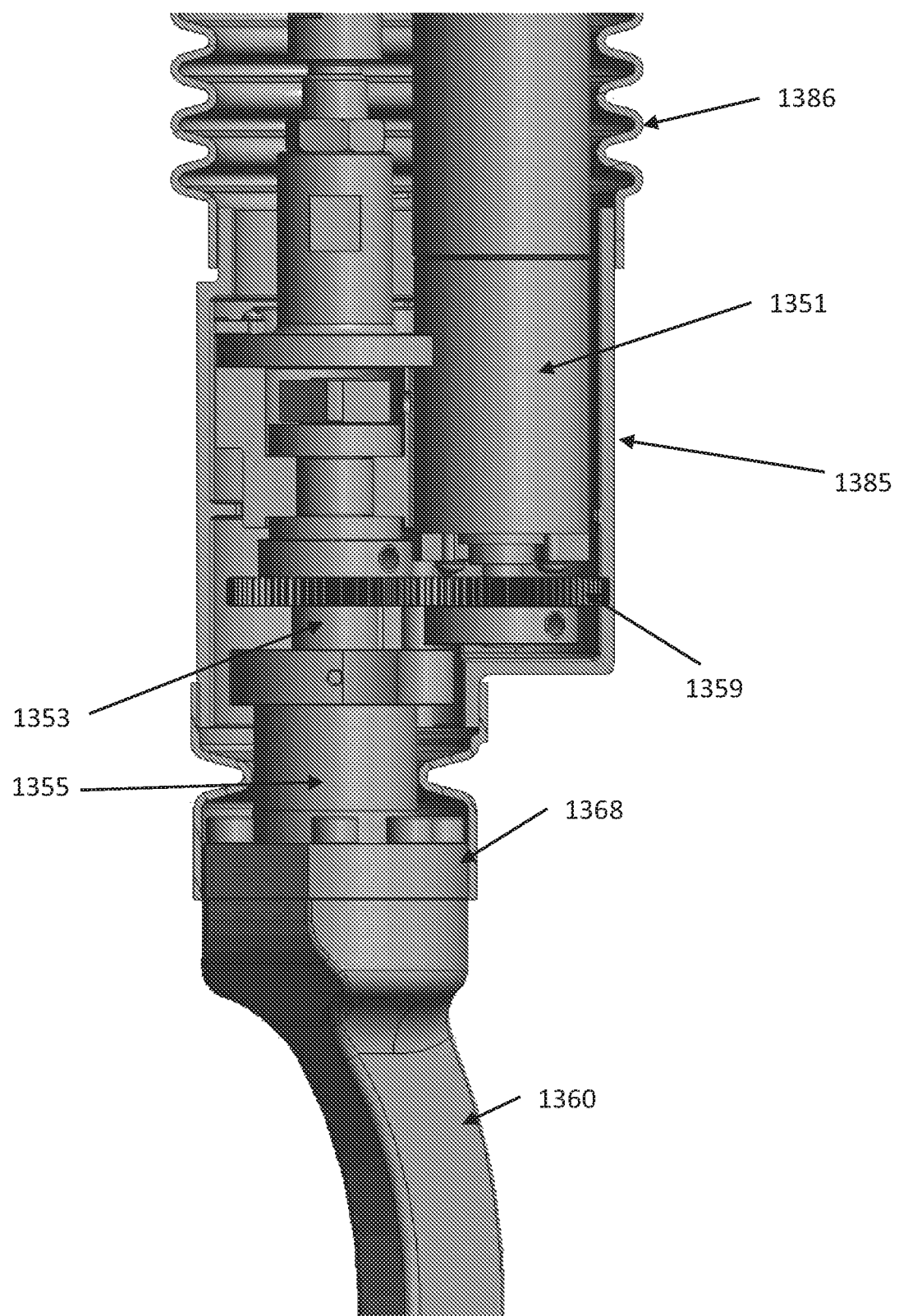
Figure 13E:
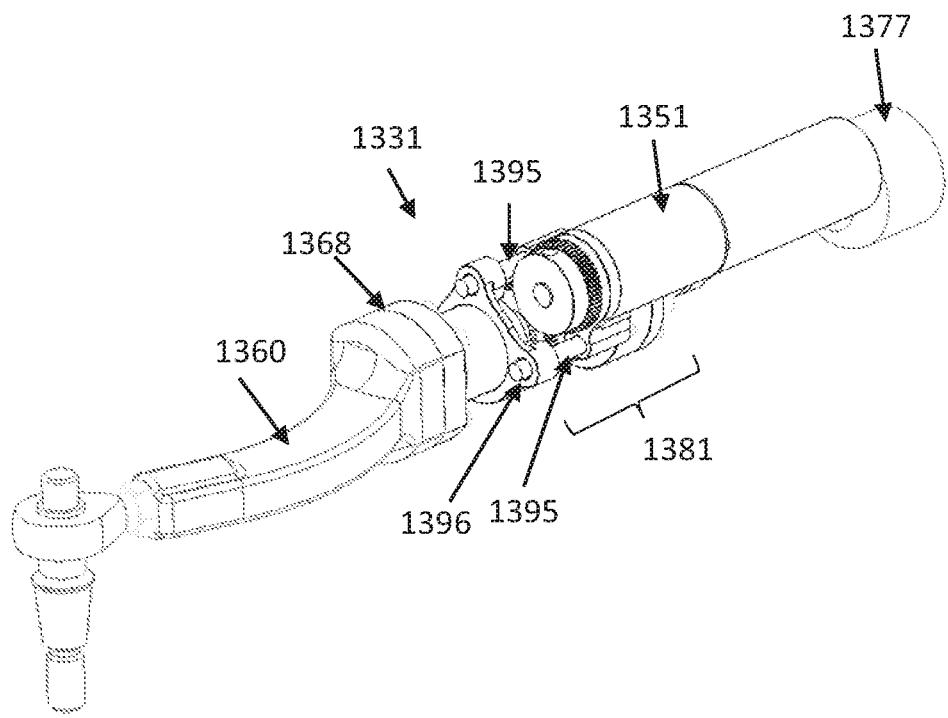
Figure 13F:
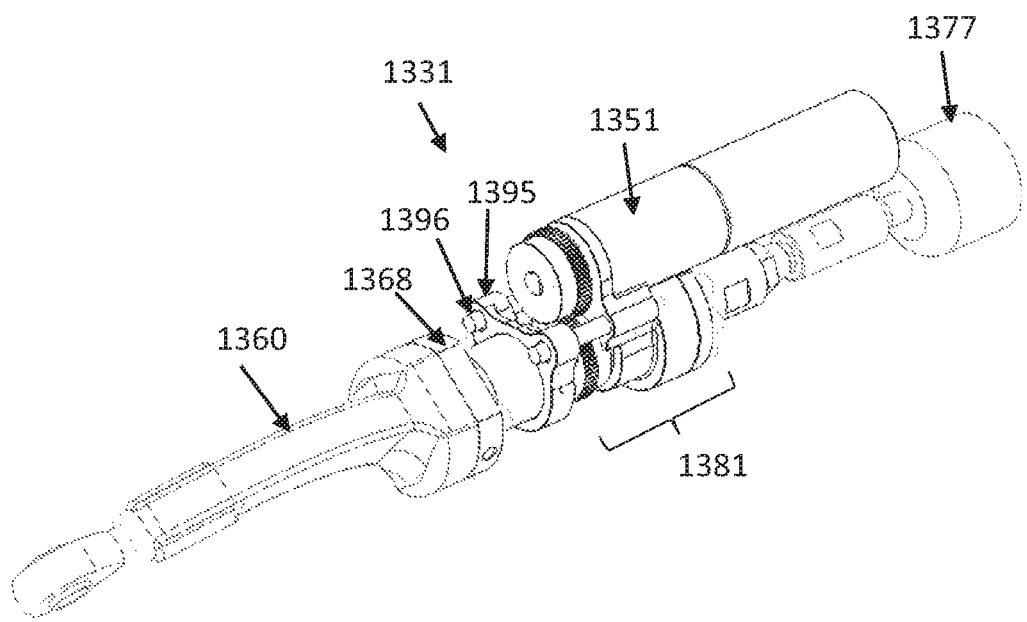
Figure 13G:
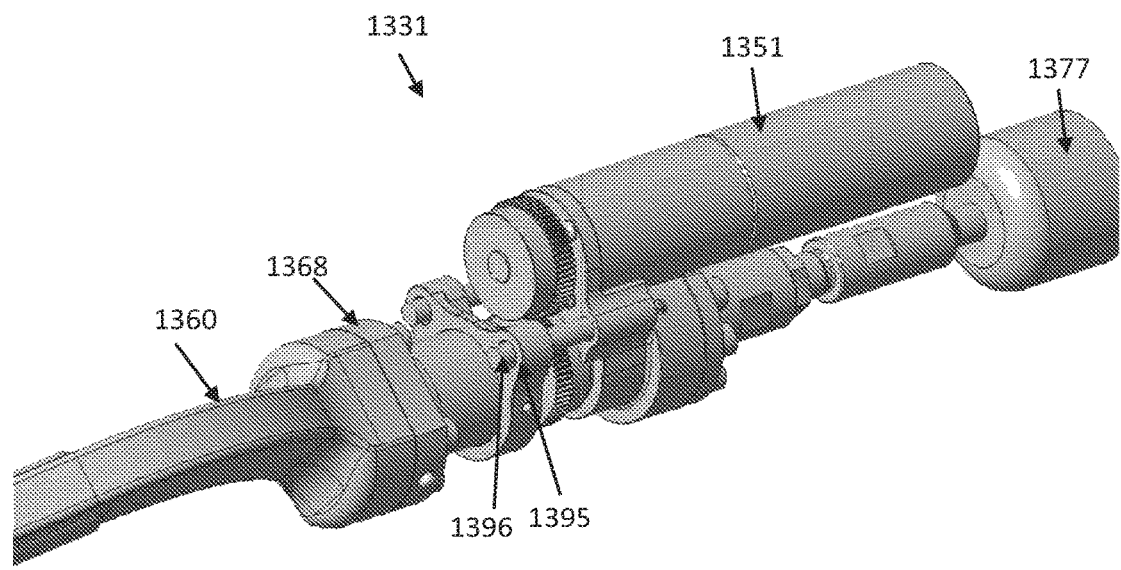
Figure 13H:
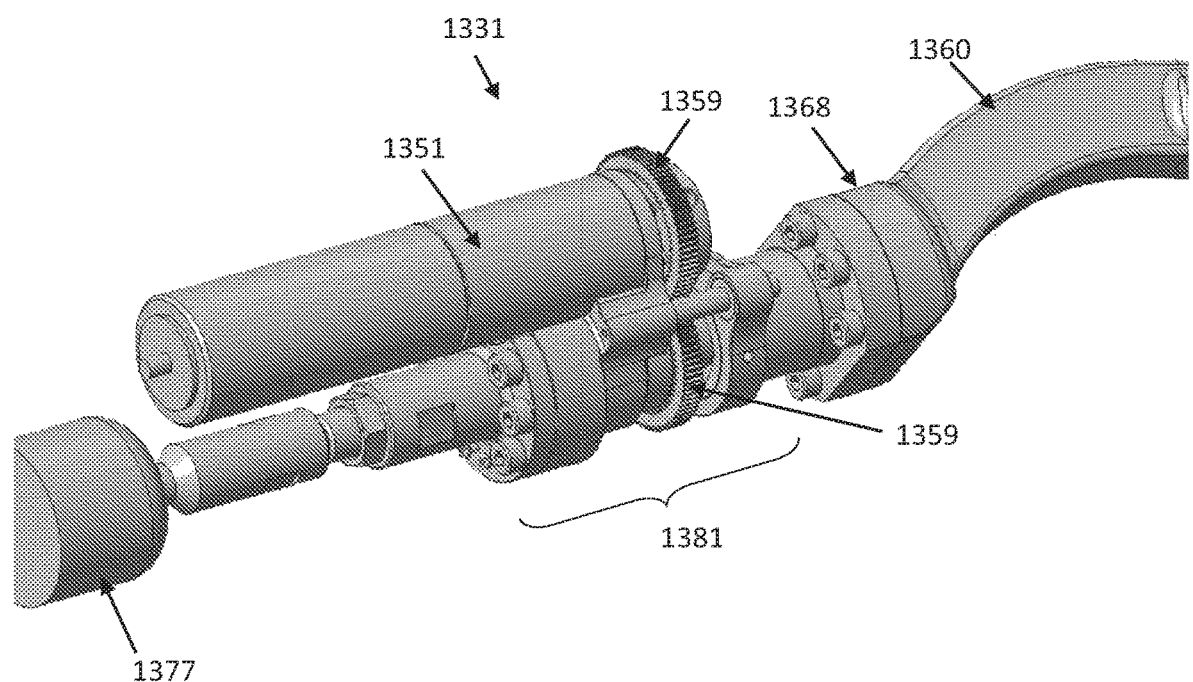

FIGS. 13A-13H illustrate another example of a toe adjusting apparatus (e.g., toe adjusting unit) that may electrically adjust the toe of the vehicle (e.g., a wheel of the vehicle), similar to that shown and described above for FIGS. 5A-5B and 8A-8B. In FIG. 13A, the toe adjusting unit 1331 includes a tie rod mount 1368 at a distal end, configured to connect to an end of the tie rod 1360. In some variations, the tie rod (anterior tie rod 1360) forms a part of the apparatus. In FIGS. 13A-13H, the tie rod mount rigidly mount the anterior tie rod to ball nut 1355 of the telescoping rod; a ball screw (not visible) is held within the ball nut and through the ball nut and partially into the distal end of the anterior toe rod. The telescoping rod portion 1381 is configured to extend or retract in the distal-to-proximal direction. The telescopic rod may include the linear actuator (e.g., in this example, a ball screw 1353 and ball nut; the ball nut may be the same feature as the tie rod mount 1368) that is acted on by the electromechanical actuator (e.g., electric motor 1351, and the set of gears 1359, etc.). The electromechanical actuator is coupled to the telescoping arm through the ball screw and ball nut (in this example, the tie rod mount), and drives rotation of the telescoping arm to extend or retract the telescoping arm relative to the tie rod. A housing 1386 (including a flexible portion 1385) may cover the electromechanical actuator and telescoping arm portion.

In this example, the telescoping rod portion 1381 is coupled in-line with a partial (e.g., truncated) tie rod, shown here as an anterior tie rod portion 1360. The posterior end of the apparatus includes a steering link mount 1377. In some variations a second tie rod portion (posterior tie rod portion) may be included between the telescoping rod and the steering link mount. The steering link mount in this example is a ball joint, allowing pivoting. The telescoping rod portion may lengthen or shorten by rotation driven by the electric motor (the rotation of which is transmitted by the set of gears) to rotate the ball screw, which rotates in the one or more ball nuts that are rigidly secured through the anterior tie rod portion to the rest of the alignment (and therefore to the frame of the vehicle). The electromechanical actuator is positioned out of line with the load-bearing path of the tie rod; in FIGS. 13A-13F, the electromechanical actuator (e.g., the motor) is position in parallel with the rest of the tie rod's load bearing path. This may conserve space and also protect the electromechanical actuator.

In FIG. 13A-13H, a steering link mount 1377 is located at a proximal end and is configured to connect to a linkage of a steering rack of the vehicle (not shown). This steering link mount may be a ball joint.

The toe adjusting unit also includes one or more (two are shown in FIGS. 13E-13H) stays (stay rods 1395) that connect the electromechanical actuator (e.g., electric motor 1351) to the main body frame of the apparatus. The stay rods are slideably connected to a bearing 1396 that is rigidly connected to the tie rod mount (directly or, as shown, indirectly) to prevent rotation of the electromechanical actuator relative to the tie rod mount during operation.

Any of the methods described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for adjusting camber of a vehicle having a suspension with an upper wishbone arm and a lower wishbone arm, the upper wishbone arm having a first end and a second end, the system comprising:
    a mount body having a translational bearing surface, wherein the mount body is configured to rigidly connect to the vehicle's frame;
    a wishbone arm holder configured to hold the first end of the upper wishbone arm so that the first end of the upper wishbone arm may pivot relative to the wishbone arm holder, wherein the wishbone arm holder is movably connected to the translational bearing surface, further wherein the translational bearing surface is configured to permit the wishbone arm holder to move in a first translational axis and to constrain the wishbone arm holder from moving in a second translational axis that is transverse to the first translational axis or a third translational axis that is transverse to the second translational axis; and
    an electromechanical actuator coupled to the wishbone arm holder to drive the wishbone arm holder along the translational bearing surface in the first translational axis.

2. The system of claim 1, further comprising an electronic controller configured to control actuation of the electromechanical actuator.

3. The system of claim 1, wherein the translational bearing surface comprises a pair of shafts extending in parallel.

4. The system of claim 1, further comprising one or more linear bearings that are rigidly connected to the wishbone arm holder and movably connected to the translational bearing surface.

5. The system of claim 1, wherein the electromechanical actuator comprises an electric motor coupled to the wishbone arm holder to move it in the first translational axis.

6. The system of claim 1, wherein the electromechanical actuator comprises a ball screw and a ball nut, wherein the ball nut is coupled to the wishbone arm holder and is configured to be driven back and forth along the ball screw.

7. The system of claim 1, further comprising an encoder configured to monitor a position of the wishbone arm holder.

8. The system of claim 1, further comprising:
    a second mount body having a second translational bearing surface, wherein the second mount body is configured to rigidly connect to the vehicle's frame;
    a second wishbone arm holder configured to hold the second end of the upper wishbone arm so that the second end of the upper wishbone arm may pivot relative to the second wishbone arm holder, wherein the second wishbone arm holder is movably connected to the second translational bearing surface, further wherein the second translational bearing surface is configured to permit the second wishbone arm holder to move in the first translational axis and to constrain the second wishbone arm holder from moving in the second translational axis or the third translational axis; and
    a second electromechanical actuator coupled to the second wishbone arm holder to drive the second wishbone arm holder along the second translational bearing surface in the second translational axis.

9. A system for adjusting camber of a vehicle having a suspension with an upper wishbone arm and a lower wishbone arm, the upper wishbone arm having a first end and a second end, the system comprising:
    a first mount body having a first translational bearing surface, wherein the first mount body is configured to rigidly connect to the vehicle's frame;
    a first wishbone arm holder configured to hold the first end of the upper wishbone arm so that the first end of the upper wishbone arm may pivot relative to the first wishbone arm holder, wherein the first wishbone arm holder is movably connected to the first translational bearing surface, further wherein the first translational bearing surface is configured to permit the first wishbone arm holder to move in a first translational axis and to constrain the first wishbone arm holder from moving in a second translational axis that is transverse to the first translational axis or a third translational axis that is transverse to the second translational axis; and
    a first electromechanical actuator coupled to the first wishbone arm holder to drive the first wishbone arm holder along the first translational bearing surface in the first translational axis;
    a second mount body having a second translational bearing surface, wherein the second mount body is configured to rigidly connect to the vehicle's frame;
    a second wishbone arm holder configured to hold the second end of the upper wishbone arm so that the second end of the upper wishbone arm may pivot relative to the second wishbone arm holder, wherein the second wishbone arm holder is movably connected to the second translational bearing surface, further wherein the second translational bearing surface is configured to permit the second wishbone arm holder to move in the first translational axis and to constrain the second wishbone arm holder from moving in the second translational axis or the third translational axis;
    a second electromechanical actuator coupled to the second wishbone arm holder to drive the second wishbone arm holder along the second translational bearing surface in the second translational axis; and an electronic controller configured to operate the first and second electromechanical actuators.

10. The system of claim 9, wherein the first translational bearing surface comprises a pair of shafts extending in parallel.

11. The system of claim 9, wherein the second translational bearing surface comprises a pair of shafts extending in parallel.

12. The system of claim 9, further comprising one or more linear bearings that are rigidly connected to the first wishbone arm holder and movably connected to the first translational bearing surface.

13. The system of claim 9, wherein the first electromechanical actuator comprises an electric motor coupled to the first wishbone arm holder to move it in the first translational axis.

14. The system of claim 9, wherein the first electromechanical actuator comprises a ball screw and a ball nut, wherein the ball nut is coupled to the first wishbone arm holder and is configured to be driven back and forth along the ball screw.

15. The system of claim 9, further comprising an encoder configured to monitor a position of the first wishbone arm holder.

16. A method of adjusting camber of a vehicle having a suspension with an upper wishbone arm and a lower wishbone arm, the upper wishbone arm having a first end and a second end, the method comprising:
   activating a first electromechanical actuator to drive a first wishbone arm holder on a first translational bearing surface that is rigidly connected to the vehicle's frame so that the first wishbone arm holder moves in a first translational axis, wherein the first wishbone arm holder is coupled to the first end of the upper wishbone arm; and
   activating a second electromechanical actuator to drive a second wishbone arm holder on a second translational bearing surface that is rigidly connected to the vehicle's frame so that the second wishbone arm holder moves in the first translation axis, wherein the second wishbone arm holder is coupled to the second end of the upper wishbone arm.

17. The method of claim 16, wherein activating the first electromechanical actuator and activating the second electromechanical actuator occurs concurrently.

18. The method of claim 16, wherein activating the first electromechanical actuator further comprises manually activating the first electromechanical actuator.

19. The method of claim 16, further comprising adjusting a toe of the suspension concurrently with adjusting the first electromechanical actuator.

* * * * *